US007805467B2

(12) United States Patent
Moir et al.

(10) Patent No.: US 7,805,467 B2
(45) Date of Patent: Sep. 28, 2010

(54) CODE PREPARATION TECHNIQUE EMPLOYING LOCK-FREE POINTER OPERATIONS

(75) Inventors: Mark S. Moir, Hampton, NH (US); David L. Detlefs, Westford, MA (US); Simon Doherty, London (GB); Maurice P. Herlihy, Brookline, MA (US); Victor M. Luchangco, Cambridge, MA (US); Paul A. Martin, Arlington, MA (US); Guy L. Steele, Jr., Lexington, MA (US)

(73) Assignee: Oracle America, Inc., Redwood City, CA (US)

( * ) Notice: Subject to any disclaimer, the term of this patent is extended or adjusted under 35 U.S.C. 154(b) by 717 days.

(21) Appl. No.: 11/343,678

(22) Filed: Jan. 30, 2006
(Under 37 CFR 1.47)

(65) Prior Publication Data
US 2006/0218561 A1    Sep. 28, 2006

Related U.S. Application Data

(60) Continuation of application No. 11/226,038, filed on Sep. 14, 2005, and a continuation-in-part of application No. 10/340,150, filed on Jan. 10, 2003, now Pat. No. 7,299,242, and a division of application No. 09/837,671, filed on Apr. 18, 2001, now Pat. No. 6,993,770.

(60) Provisional application No. 60/261,633, filed on Jan. 12, 2001.

(51) Int. Cl.
*G06F 12/00* (2006.01)

(52) U.S. Cl. .................................................. 707/814

(58) Field of Classification Search ........................ None
See application file for complete search history.

(56) References Cited

U.S. PATENT DOCUMENTS 4,584,640 A    4/1986    MacGregor et al.

(Continued)

FOREIGN PATENT DOCUMENTS

EP    0 366 585    5/1990

(Continued)

OTHER PUBLICATIONS

Greenwald, Michael "The Synergy Between Non-blocking Synchronization and Operating System Structure." 1996, pp. 1-14.*

(Continued)

*Primary Examiner*—John R. Cottingham
*Assistant Examiner*—Robert Timblin
(74) *Attorney, Agent, or Firm*—Robert C Kowert; Meyertons, Hood, Kivlin, Kowert & Goetzel, P.C.

(57) ABSTRACT

A methodology has been discovered for transforming garbage collection-dependent algorithms, shared object implementations and/or concurrent software mechanisms into a form that does not presume the existence of an independent, or execution environment provided, garbage collector. Algorithms, shared object implementations and/or mechanisms designed or transformed using techniques described herein provide explicit reclamation of storage using lock-free pointer operations. Transformations can be applied to lock-free algorithms and shared object implementations and preserve lock-freedom of such algorithms and implementations. As a result, existing and future lock-free algorithms and shared object implementations that depend on a garbage-collected execution environment can be exploited in environments that do not provide garbage collection. Furthermore, algorithms and shared object implementations that employ explicit reclamation of storage using lock-free pointer operations such as described herein may be employed in the implementation of a garbage collector itself.

28 Claims, 7 Drawing Sheets

U.S. PATENT DOCUMENTS

| | | | |
|---|---|---|---|
| 4,847,754 A | | 7/1989 | Obermarck et al. |
| 5,224,215 A | | 6/1993 | Disbrow |
| 5,319,778 A | | 6/1994 | Catino |
| 5,428,761 A | | 6/1995 | Herlihy et al. |
| 5,644,709 A | * | 7/1997 | Austin .......................... 714/53 |
| 5,806,065 A | * | 9/1998 | Lomet ............................ 707/8 |
| 6,128,710 A | * | 10/2000 | Greenspan et al. .......... 711/152 |
| 6,144,965 A | * | 11/2000 | Oliver ........................ 707/100 |
| 6,178,423 B1 | | 1/2001 | Douceur et al. |
| 6,349,334 B1 | * | 2/2002 | Faupel et al. ................ 709/224 |
| 6,360,219 B1 | | 3/2002 | Bretl et al. |
| 6,360,220 B1 | | 3/2002 | Forin |
| 6,366,932 B1 | | 4/2002 | Christenson |
| 6,473,773 B1 | * | 10/2002 | Cheng et al. ................ 707/200 |
| 6,581,063 B1 | | 6/2003 | Kirkman |
| 6,651,146 B1 | | 11/2003 | Srinivas et al. |
| 6,826,757 B2 | | 11/2004 | Steele, Jr. et al. |
| 6,901,588 B1 | * | 5/2005 | Krapf et al. ................. 717/164 |
| 7,155,467 B1 | * | 12/2006 | Rohrs .......................... 707/206 |
| 2001/0047361 A1 | | 11/2001 | Martin et al. |
| 2002/0059425 A1 | * | 5/2002 | Belfiore et al. .............. 709/226 |
| 2003/0140085 A1 | | 7/2003 | Moir et al. |
| 2003/0174572 A1 | | 9/2003 | Moir et al. |
| 2003/0182462 A1 | | 9/2003 | Moir et al. |
| 2003/0182465 A1 | | 9/2003 | Moir et al. |
| 2004/0015510 A1 | | 1/2004 | Moir et al. |
| 2004/0015642 A1 | | 1/2004 | Moir et al. |
| 2004/0034673 A1 | | 2/2004 | Moir et al. |
| 2004/0153687 A1 | | 8/2004 | Moir et al. |

FOREIGN PATENT DOCUMENTS

| | | |
|---|---|---|
| EP | 0 466 339 | 1/1992 |
| WO | 86/00434 | 1/1986 |
| WO | 01/53942 | 7/2001 |
| WO | 01/53943 | 7/2001 |
| WO | 01/80015 | 10/2001 |
| WO | 01/82057 | 11/2001 |
| WO | 03/060705 | 7/2003 |
| WO | 03/060715 | 7/2003 |

OTHER PUBLICATIONS

Herlihy, Maurice, P. Impossibility and Univeraslity Results for Wait-Free Synchronization. 1988, pp. 1-15.*

Turek, John et al. Locking without Blocking: making Lock Based Concurrent Data Structure Algorithms Nonblocking. 1992, pp. 212-221.* http://en.wikipedia.org/wiki/Lock-free_and_wait-free_algorithms.*

A Framework for Implementing Objects and Scheduling Tasks in Lock-Free Real-Time Systems (1996) by James H. Anderson, Srikanth Ramamurthy in Proceedings of the 17th IEEE Real-Time Systems Symposium.*

Tony Printezis, David Detlefs, A generational mostly-concurrent garbage collector, Proceedings of the 2nd international symposium on Memory management, p. 143-154, Oct. 15-16, 2000, Minneapolis, Minnesota, United States.*

S. Prakash , Yann Hang Lee , T. Johnson, A Nonblocking Algorithm for Shared Queues Using Compare-and-Swap, IEEE Transactions on Computers, v.43 n.5, p. 548-559, May 1994.*

Tony Printezis, David Detlefs, A generational mostly-concurrent garbage collector, Proceedings of the 2nd international symposium on Memory management, p. 143-154, Oct. 15-16, 2000, Minneapolis, Minnesota, United States.*

U.S. Appl. No. 09/547,288, filed Apr. 11, 2000 and naming as inventor(s) Shavit, et al.

U.S. Appl. No. 09/547,290, filed Apr. 11, 2000 and naming as inventor(s) Shavit, et al.

U.S. Appl. No. 09/710,218, filed Nov. 10, 2000 and naming as inventor(s) Harris, Timothy.

Rinard, Martin C., "Effective Fine-Grain Synchronization for Automatically Parallelized Programs Using Optimistic Synchronization Primitives," ACM Trans. Computer Systems, 17(4):337-371, Nov. 1999.

Herlihy, M.P., et al., "Linearizability: A Correctness Condition for Con-Current Objects," ACM Transactions on Programming Languages and Systems, 12(3):463-492, Jul. 1990.

Herlihy, M.P., et al., "Wait-Free Synchronization," ACM Transactions on Programming Languages and Systems, 11(1):124-149, Jan. 1991.

Massalin, H., et al., "A Lock-Free Multiprocessor OS Kernel," Technical Report TR CUCS-005-9, Columbia University, New York, NY, 1991, 21 pages.

Massalin, Henry, "Synthesis:An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the internet on Jul. 13, 2001: URL:ftp//ftp.cs.columbia.edu/reports-1992/cucs-039-92.ps.gz].

Bershad, B.N., "Pratical Considerations for Non-Blocking Concurrent Objects," Proceedings 13th IEEE International Conference on Distributed Computed Systems, pp. 264-273. IEEE Computer Society Press, Washington, D.C., 1993.

Herlihy, M.P., "A Methodology for Implementing Highly Concurrent Data Objects," ACM Transactions on Programming Languages and Systems, 15(5):745-770, Nov. 1993.

Attiya, Hagit, et al., "Are Wait-Free Algorithims Fast?" Journal of the ACM, 41(4):725-763, Jul. 1994.

Lamarca, A., "A performance evaluation of lock-free synchronization protocols," Proceedings of the 13th Annual ACM Symposium on Principals of Distributed Computing, pp. 130-140, ACM Press, New York, NY, 1994.

Michael, Maged M. et al., "Simple, Fast, and Practical Non-Blocking and Blocking Concurrent Queue Algorithims," Proceedings of PODC, pp. 267-275, May 1996.

Attiya, H., et al., "Universal Operations: Unary versus Binary," Proceedings of the 15th Annual ACM Symposium on Principles of Distributed Computing, pp. 223-232, ACM Press, New York, NY, 1996.

Greenwald, M.B., et al. "The Synergy Between Non-Blocking Synchronization and Operating System Structure," Proceedings of the 2nd Symposium on Operating Systems Design and Implementation, pp. 123-136, Usenix Association, Berkeley, CA, 1996.

Afek, Y., et al., "Disentangling Multi-Object Operations," Proceedings of the 16th Annual ACM Symposium on Principles of Distributed Computing, pp. 111-120, Aug. 1997, Santa Barbara, CA.

Arora, N.S., et al., "Thread Scheduling for Multiprogrammed Multiprocessors," Proceedings of the 10th Annual ACM Symposium on Parallel Algorithims and Architectures, pp. 119-129, ACM Press, New York, NY, 1198.

Attiya, Hagit, et al., "Atomic Snapshots in O(n log n) Operations," SIAM Journal on Computing, 27(2):319-340, Apr. 1998.

Greenwald, M., "Non-Blocking Synchronization and System Design," PhD thesis, Stanford University Technical Report STAN-CS-TR-99-1624, Palo Alto, CA, Aug. 1999, 241 pages.

Agesen, Ole, et al., "DCAS-Based Concurrent Dequest," SPAA 2000, Proceedings of the 12th Annual ACM Symposium on Parallel Algorithims and Architectures, pp. 137-146, ACM Press, New York, NY, ISBN:1-58113-185-2, 2000.

Detlefs, David L., et al., "Even Better DCAS-Based Concurrent Deques," Lecture Notes on Computer Science, vol. 1914, pp. 59-73, Springer-Verlag, Berlin, Germany, ISBN: 3-540-41143-7, 2000.

Anderson, James H., et al. "Universal Constructions for Large Objects," IEEE Transactions on Parallel and Distributed Systems, vol. 10, No. 12, pp. 1317-1332, 1999.

Detlefs, David, "Garbage Collection and Run-time Typing as C++ Library," Proceedings of the 1992 Usenix C++ Conference, Digital Equipment Corporation Systems Research Center, 20 pages, Jun. 18, 1992 [URL: http://citeseer.ist.psu.edu/detlefs92garbage.html].

Detlefs, David L., et al., "Lock Free Reference Counting,"Proc. 20th Annual ACM Symposium on Principles of Distributed Computing, pp. 190-199, ACM Press, New york, NY 2001.

Dice, David et al., "Mostly Lock-Free Reference Malloc," Proceedings of the 3rd International Symposium on Memory Management, pp. 163-174, ACM Press, New York, NY 2002.

Harris, T., et al., "Language Support for Lightweight Transactions," Proc. 18th Annual ACM SIGPLAN Conf. on Object-Oriented Programming Systems, Languages, and Applications, pp. 388-402, ACM Press, New York, NY, 2003.

Herlihy, Maurice, "Dynamic-Sized Lockfree Data Structures," Sun Microsystems Technical Report SMLI TR-2002-112, Jun. 2002.

Herlihy, Maurice, et al., "The Repeat Offender Problem: A Mechanism for Supporting Dynamic-Sized Lock-Free Data Structures," Sun Microsystems Technical Report SMLI-TR 2002-112, Jun. 2002.

Herlihy, Maurice, et al., "Obstruction-Free Synchronization: Double-Ended Queues as an Example," Proceedings of the 23rd International Conference on Distributed Computing, pp. 5222, IEEE Computer Society, Washington, D.C., 2003.

Hesselink, W.H., et al., "Waitfree distributed memory management by Create, and Read Until Deletion ({CRUD)}," Technical Report: SEN-R9811, Dept. of Math and Computing Science, University of Groningen, the Netherlands, 21 pages, Dec. 31, 1998 [URL: http://citeseer.ist.psu.edu/hesselink98waitfree.html].

Jayanti, P., et al., "Efficient and Practical Constructions of LL/SC Variables," Proceedings of the 22nd Annual ACM Symposium on the Principles of Distributed Computing, pp. 285-294, ACM Press, New York, NY 2003.

Jones, Richard, et al., "Garbage Collection Alogorithms for Automatic Dynamic Memory Management," pp. 19-25, 200-202, John Wiley & Sons, Ltd. Chichester, England, 1996.

Michael. Maged M., et al., "Non-Blocking Algorithims and Preemption Safe Locking on Multiprogrammed Shared Memory Multiprocessors," Journal of Parallel and Distributed Computing, vol. 15, No. 1, pp. 1-26, May 25, 1998.

Michael Maged M., et al., "Safe Memory Reclamation for Dynamic Lock-Free Objects Using Atomic Reads and Writes," Proceedings of the 21st Annual ACM Symposium on the Principles of Distributed Computing, pp. 21-30, 30 ACM Press, New York, NY, 2002.

Michael, M., "Scalable Lock-Free Dynamic Memory Allocation," Proceedings of the ACM SIGPLAN 3004 Conference on Programming Language Design and Implementation, pp. 35-46, ACM Press New York, NY, 2004.

Moir, Mark et al., "Wait-Free Algorithims for Fast,Long-Lived Renaming," Science of Computer Programming, vol. 25, No. 1, pp. 1-39, Aug. 1995.

Moir, Mark, "Practical implementation of non-blocking synchronization primitives," Proceedings of the Sixteenth Annual ACM Symposium on Principles of Distributed Computing, pp. 219-228, ACM Press New York, NY 1997.

Moir, Mark, "Transparent Support for Wait-Free Transactions," Proceedings of the 11th International Workshop on Distributed Algorithims, pp. 305-319, Springer-Verlag, London, UK, 1997.

Moir, Mark, "Laziness Pays! Using Lazy Synchronization Mechanisms to Improve Non-Blocking Constructions," Proc. 19th Annual ACM Symposium on Principles of Distributed Computing, pp. 61-70, ACM Press, New York, NY 2000.

Prakash, Sundeep et al., "Non-Blocking Algorithims for Concurrent Data Structures," Technical Report 91-002, University of Florida, Jul. 1, 1991 [URL: http://citeseer.ist.psu.edu/prakash91nonblocking.html].

Prakash, Sundeep, et al., "A Nonblocking Algorithim for Shared Queues Using Compare-and-Swap," IEEE Transactions on Computers, vol. 43, No. 5, pp. 548-559, May 1994.

Shann, Chien-Hua, et al., "A Practical Nonblocking Queue Algorithim Using Compare-and-Swap," Proceedings of the Seventh International Conference on Parallel and Distributed Systems, pp. 470, IEEE Computer Society, Washington, D.C., 2000.

Goetz, Brian, "A First Look at JSR 166: Concurrency Utilities," Mar. 1, 2004 [URL: http://today.java.net/lpt/a/76].

Treiber, R., "Systems Programming: Coping with Parallelism," IBM Technical Report RJ5118, Apr. 23, 1986.

Turek, John, et al., "Locking Without Blocking: Making Lock Based Concurrent Data Structure Algorithims Nonblocking," Proceedings of the Eleventh ACM SIGACT-SIGMOD-SIGART Symposium on Principles of Database Systems, pp. 212-222, ACM Press, New York, NY 1992.

Valois, John D., "Lock-Free Linked Lists Using Compare-and-Swap," Proceedings of the Fourteenth ACM Symposium on Principles of Distributed Computing, pp. 214-222, ACM Press, New York, NY 1995.

* cited by examiner ions on the burden of determining when memory can (or should) be deallocated. Moreover, by assuming the existence of an automatic dynamic memory management facility or garbage collector, certain additional complexities of concurrent data structures and software can also be avoided. In particular, it is often possible to defer to the garbage collector the significant additional complexity of coordinating deallocation of memory with potential concurrent accesses thereto.

CODE PREPARATION TECHNIQUE EMPLOYING LOCK-FREE POINTER OPERATIONS

CROSS-REFERENCE TO RELATED APPLICATION(S)

This patent application is a continuation of U.S. patent application Ser. No. 11/226,038, filed on Sep. 14, 2005 and naming as inventors Simon Doherty, Maurice P. Herlihy, Victor M. Luchangco, and Mark S. Moir. This patent application is also a continuation-in-part of U.S. patent application Ser. No. 10/340,150, filed on Jan. 10, 2003 and naming as inventors Mark S. Moir, Victor Luchangco and Maurice Herlihy. This patent application is also a divisional of U.S. patent application Ser. No. 09/837,671, filed on Apr. 18, 2001 and naming as inventors David L. Detlefs, Paul A. Martin, Mark S. Moir, and Guy L. Steele Jr., which in turn claims priority under 35 U.S.C. §19(e) of U.S. Provisional Application 60/261,633, filed on Jan. 12, 2001.

BACKGROUND

1. Field of the Invention

The present invention relates generally to coordination amongst execution sequences in a multiprocessor, and more particularly, to techniques for coordinating access to shared data and pointer encodings.

2. Description of the Related Art

Use (at runtime) of an automatic dynamic memory management facility, e.g., a garbage collector (GC), can greatly simplify the design of a sequential implementation of a data structure or software mechanism by largely relieving the programmer of the burden of determining when memory can (or should) be deallocated. Moreover, by assuming the existence of an automatic dynamic memory management facility or garbage collector, certain additional complexities of concurrent data structures and software can also be avoided. In particular, it is often possible to defer to the garbage collector the significant additional complexity of coordinating deallocation of memory with potential concurrent accesses thereto.

Furthermore, concurrent data structure implementations and/or software mechanisms for an execution environment that provides garbage collection can (in essence) benefit from a free solution to the so-called ABA problem. In general, the ABA problem arises when a data system fails to detect that a value changes (e.g., from A to B) and then changes back to its original value (i.e., A). For example, if a compare-and-swap-type operation (e.g., a CAS or DCAS operation) is about to operate on a pointer and the object to which it points is freed and then reallocated, then it is possible for the CAS or DCAS to succeed even though it should fail. In a proper implementation, this possibility should be prevented by ensuring that an object is not freed while an execution thread has pointers to it. Garbage collector implementations typically ensure such behavior, e.g., by stopping a thread and inspecting its registers and stack for pointers. However, in the absence of a garbage collector, responsibility for handling the ABA problem generally falls to the concurrent data structure implementation itself.

For these and other reasons, deferring complexity to a runtime garbage collection facility can be quite attractive. However, such a facility is not always available or practical. For example, many common programming and execution environments do not support garbage collection. Second, even those environments that do support garbage collection often employ excessive synchronization, such as locking and/or stop-the-world mechanisms, which impair scalability and may be impractical for certain applications. Worse still, some software systems (notably implementations of a garbage collector itself) simply cannot defer the complexity to a runtime garbage collection system. For example, concurrent shared object implementations that depend on the existence of a garbage collection facility are generally not suitable for use in the implementation of the garbage collector itself. Accordingly, for some software systems, concurrent data structures and mechanisms, direct solutions to the difficult problem of coordinating concurrent access to shared, storage are necessary or desirable.

The difficulty of achieving correct solutions should not be underestimated, particularly for dynamically-sizable shared data structures. Indeed, despite the fact that use of locks in concurrent programs gives rise to a host of problems including deadlock, starvation and intolerance to thread failure, many concurrent or cooperative software systems in use today employ lock-based techniques.

Significant research attention has been paid to "nonblocking" synchronization, i.e., synchronization that does not depend on locks. Unfortunately, both the design and verification of nonblocking algorithms are very challenging. Accordingly, much of the early work in this area has focused on what can be achieved in principle, yet has yielded relatively few practical results. In particular, work on nonblocking shared data structures has typically ignored the important issues of managing memory for dynamic-sized shared data structures. Indeed, much of the work that has been done before a few years ago is either incorrect (i.e., inoperative despite its surface appeal) or has serious drawbacks.

In view of the above, nonblocking structures and techniques are desired that would allow programmers to exploit the advantages of a garbage collected execution environment in the design of data structure implementations despite the absence of a garbage collection facility.

SUMMARY

Accordingly, we have developed a methodology for transforming garbage collection-dependent algorithms, shared object implementations and/or concurrent software mechanisms into a form that does not presume the existence of an independent, or execution environment provided, garbage collector. Algorithms, shared object implementations and/or mechanisms designed or transformed using techniques described herein provide explicit reclamation of storage using lock-free pointer operations. Transformations can be applied to lock-free algorithms and shared object implementations and preserve lock-freedom of such algorithms and implementations. As a result, existing and future lock-free algorithms and shared object implementations that depend on a garbage-collected execution environment can be exploited in environments that do not provide garbage collection. Furthermore, algorithms and shared object implementations that employ explicit reclamation of storage using lock-free pointer operations such as described herein may be employed in the implementation of a garbage collector itself.

While some realizations of the present invention include transformation techniques or facilities, others realizations include the lock-free implementations themselves (whether or not derived through such transformations). For example, some realizations include a shared object or data structure that employs lock-free pointer operations. Some realizations include multiprocessor systems and/or computer program products incorporating explicit reclamation of storage using lock-free pointer operations. In some multiprocessor environments, algorithms and/or shared object implementations employed by operating system or execution environment facilities (including, without limitation, garbage collection or other automatic dynamic memory management facilities) may exploit the techniques described herein to explicitly reclaim storage.

BRIEF DESCRIPTION OF THE DRAWINGS

The present invention may be better understood, and its numerous objects, features, and advantages made apparent to those skilled in the art by referencing the accompanying drawings.

FIG. 4 illustrates an initial state in which a shared object and a shared reference thereto are instantiated in shared memory. FIG. 5 illustrates a state (including a distributed representation of reference count state) after the shared reference is copied to a private variable.

FIG. 6 illustrates a state in which two shared pointers and a private pointer (copied from one of the shared pointers) all reference a shared object. FIG. 7A illustrates a state (including an updated reference count state) after one of the shared references is destroyed. FIG. 7B illustrates a state (including an updated reference count state) after the private reference is destroyed. FIG. 7C illustrates a state (including an updated reference count state) after the other one of the shared references is destroyed.

FIG. 8 illustrates a state in which both a shared pointer and a private pointer have been destroyed. FIG. 9 illustrates a state in which all references to a shared object have been destroyed.

The use of the same reference symbols in different drawings indicates similar or identical items.

The use of the same reference symbols in different drawings indicates similar or identical items.

DESCRIPTION OF THE PREFERRED EMBODIMENT(S)

Figure 1B:
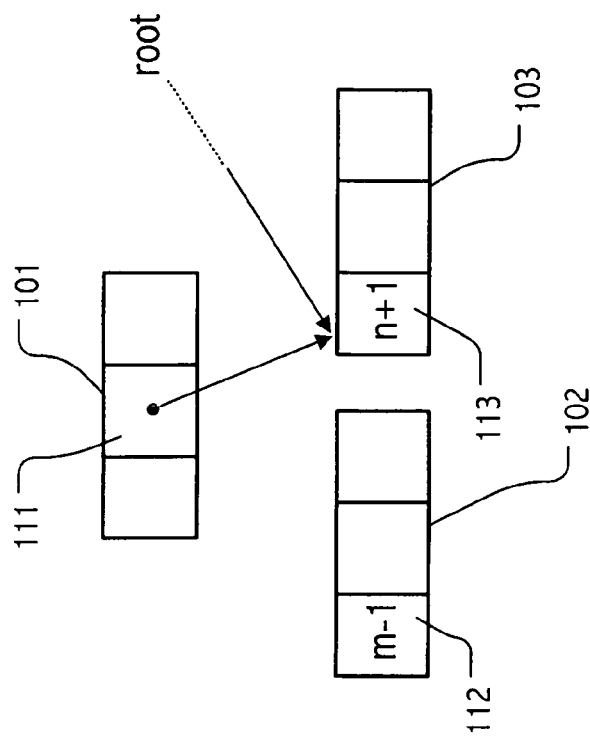
FIGS. 1A and 1B illustrate before and after states of a simple data structure in which reference counts are provided.

Our techniques are based generally on the notion of reference counting, which persons of skill in the art will recognize as one of the classical methods of managing storage reclamation. See generally, Jones and Lins, *Garbage Collection: Algorithms for Automatic Dynamic Memory Management*, John Wiley & Sons Ltd. (1996), pp. 19-25 (reviewing reference counting). However, our techniques use synchronization techniques, e.g., using compare-and-swap (CAS) operations, double compare-and-swap (DCAS) operations, load-linked/store-conditional (LL/SC) operation pairs, emulations of such operations, transactional memory facilities or the like, to maintain reference counts consistent with manipulations performed in the course of a given computation, by lock-free pointer operations. In a powerful exploitation of the developed techniques, we employ a strategy of distributing contributions to a "reference count," rather than representing the complete count of references to a shared object as a single unitary encoding.

Synchronization techniques are employed to update certain reference count contributions for an object atomically with a check that a pointer to the object still exists. Synchronization techniques are further employed, in some situations, to atomically update multiple contributions to a reference count. Advantageously, we are able perform these updates using single-target synchronizations. Of course, more powerful (and typically more expensive) synchronizations may be employed; however, our techniques facilitate lightweight (e.g., low synchronization overhead) implementations and implementations suitable for computational environments in which only single-target synchronizations (e.g., a single-target CAS operation or LL/SC operation pair) are provided.

An important challenge that our solutions address is properly maintaining a reference count representation for an object to reflect the fact that a new pointer to the object has been created by reading the pointer from a shared memory location. Most other cases, e.g., copying a pointer, are tractable because we know that there is a pointer to the object that will survive at least until we update the object's reference count. Therefore, the primary difficulty arises because, after a thread reads a pointer to an object, but before it increments the object's reference count to reflect this fact, all other pointers to the object may be destroyed, causing its reference count to fall to zero, and the object to be deallocated. Incrementing the reference count of an object after it has been deallocated can have disastrous consequences, because the memory for that object may have since been reallocated and reused for a different purpose.

By weakening the typical reference counting implementation invariant that reference counts record the exact number of pointers to an object, we are able to separate the updates of reference counts from the updates of the pointers themselves. This allows us to support strong synchronization operations on pointers. In contrast, classical reference counting implementations for concurrent environments typically require the use of locks on all objects that might be shared between threads. See generally, Jones and Lins, pp. 200-202 (reviewing concurrent reference counting methods).

We have designed our methodology to preserve lock-freedom. That is, if a GC-dependent implementation is lock-free, then so too will be a GC-independent implementation derived using our methodology. In this regard, the assertion of lock-freedom may ignore certain operating system or execution environment provided facilities such as for creation and destruction of objects. For example, in many systems, malloc and free (or other similar facilities) are provided. Unfortunately, implementations of such facilities are often not lock-free, and therefore, strictly-speaking, implementations based thereon are not themselves lock-free. However, most production-quality malloc/free implementations do attempt to avoid contention for locks—for example, by maintaining separate allocation buffers for each thread—and therefore avoid most of the problems associated with locks. As a result, while some exploitations of the present invention build upon underlying facilities, which are truly lock-free, others need not. Accordingly, even concurrent shared object implementations for execution environments in which implementations of malloc, free or similar facilities are not, strictly speaking, lock-free derive substantial benefits from our techniques.

As used herein, an implementation of a concurrent data structure is said to be lock-free if it guarantees that in any execution, after a finite number of steps of one of its operations, some operation on the data structure completes. Of course, it is possible that the operating system, execution environment or garbage collector might prevent threads from executing any instructions, in which case, no operations will be completed on the data structure. However, this does not mean that the concurrent data structure implementation is not lock-free. Thus, it is not contradictory to talk about a lock-free GC-dependent concurrent data structure implementation, even in environments in which a garbage collector, operating system or execution environment facility is blocking. Lock-free programming is increasingly important for overcoming the problems associated with locking, including performance bottlenecks, susceptibility to delays and failures, design complications, and, in real-time systems, priority inversion.

As noted above, our methodology is based on the well-known garbage collection technique of reference counting. We refer to our methodology as Lock-Free Reference Counting. In some realizations, each object includes or has an associated count of the number of pointers that reference it. Such objects are freed if and only if this count reaches zero. Persons of ordinary skill in the art will recognize that one reason that typical tracing-type garbage collectors "stop the world" (e.g., by suspending all mutator threads) is that some of these pointers can reside in registers and/or stacks and that discovery of these pointers may require operating system support. As a result, garbage collection is difficult to perform concurrently with execution of mutator threads. Accordingly, one of our goals is to enable programmers of multiprocessor systems to take advantage of the simplicity afforded by the existence of automatic dynamic memory management, without having to use locks or stop-the-world techniques.

We have previously described lock-free solutions to some of the above described problems. See e.g., commonly-owned U.S. application Ser. No. 09/837,671, filed Apr. 18, 2001, entitled "LOCK FREE REFERENCE COUNTING," and commonly-owned U.S. patent application Ser. No. 10/340, 150, filed Jan. 10, 2003, entitled "SINGLE-WORD LOCK-FREE REFERENCE COUNTING." For at least some environments and exploitations, the present disclosure improves upon lock-free pointer operations previously disclosed, while building upon the methodologies and techniques previously disclosed. Accordingly, the present disclosure adds to the growing suite of lock-free pointer operation implementations that may be employed consistent with the teachings of our disclosure(s).

Illustrative Problem

Figure 1A:
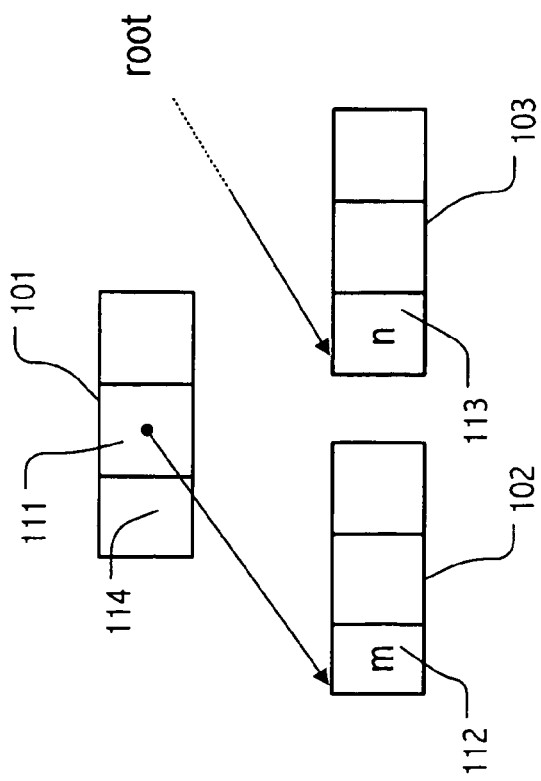

As an initial proposition, to maintain accurate reference counts, we would like to, in effect, atomically create a pointer to an object and increment that object's reference count, and to, in effect, atomically destroy a pointer to an object and decrement its reference count. FIGS. 1A and 1B illustrate simple unitary encodings of reference counts and appropriate reference updates when a pointer value in field 111 of object 101 is changed to reference object 103 rather than object 102. FIG. 1A illustrates the pre-change states of object 101, 102 and 103, while FIG. 1B illustrates the post-change states. Reference count fields 112 and 113 of the respective objects are decremented and incremented accordingly. In this way, each object's reference count (e.g., 112, 113, and 114, respectively) always accurately reflects the number of pointers to it. By freeing an object once (and only once) its reference count becomes zero, it is possible to ensure that objects are not freed prematurely, but that they are eventually freed when no pointers to the object remain.

A difficulty that arises in the above-described approach is the apparent need to atomically modify three separate memory locations, e.g., the pointer store and the reference count fields of the objects to which the store points both before and after update. Unfortunately, even a dual-target synchronization operation such as a double compare-and-swap (DCAS) operation is generally not strong enough to atomically update the three separate memory locations. For example, referring to the illustration of FIGS. 1A and 1B, if a pointer value in shared memory (e.g., that stored in field 111 of object 101) points to object 102, and we change the pointer value to instead point to another object 103, then we would have to atomically (i) modify the pointer (i.e., the contents of field 111), (ii) increment reference count 113 of object 103 and (iii) decrement reference count 112 of object 102.

However, it turns out that a weaker requirement on the reference counts suffices, and that this requirement can be achieved using a DCAS operation or similar facility as described in U.S. application Ser. No. 09/837,671, or using single-target synchronization as described in U.S. patent application Ser. No. 10/340,150 or herein. This weakening is based in part on the insight that reference counts do not always need to be accurate. Instead, it is sufficient that if the number of pointers to an object is non-zero, then so too is its reference count and that if the number of pointers is zero, then the reference count eventually becomes zero. These two requirements respectively guarantee that an object is never freed prematurely, and that the reference count of an object that has no pointers to it eventually becomes zero, so that it can be freed. Furthermore, based on the above insight, it is safe for a thread to increment an object's reference count before creating a new pointer to it, provided that the thread eventually either creates the pointer or, if not, decrements the reference count to compensate for the previous increment.

Unfortunately, an important hazard tends to complicate solutions. In particular, it is important to observe that when we load a pointer from a shared memory location, we need to increment the reference count of the object to which the loaded value points. If we can access this reference count only with a single-target operation, then there is a risk that the object will be freed before we increment the reference count, and that the subsequent attempt to increment the reference count will corrupt memory that has been freed, and potentially reallocated for another purpose. U.S. application Ser. No. 09/837,671 discloses solutions based on lock-free pointer operations that employ a DCAS operation to increment an object's reference count while atomically ensuring that a pointer to the object still exists. U.S. patent application Ser. No. 10/340,150 discloses additional solutions that employ lock-free pointer operations that use single-target synchronization techniques to delay deallocation of an object until we have first checked that no process (or thread) will access the object. The disclosures of U.S. application Ser. Nos. 09/837, 671 and 10/340,150 are incorporated herein by reference. This disclosure adds still further solutions based on lock-free pointer operation techniques that employ a strategy of distributing contributions to a "reference count," rather than representing the complete count of references to a shared object as a single unitary encoding.

Lock-Free Reference Counting

Some lock-free reference counting (LFRC) implementations in accordance with the present invention provide a set of pointer operations that mediate access and manipulation of pointers consistent with the goals described above. For example, an LFRC implementation may provide a set of operations that support loading, storing, copying, and destroying pointers. For many of the concurrent shared object implementations of interest, additional operations may be provided. For example, to support concurrent shared object implementations in which compare-and-swap (CAS) constructs are employed to mediate concurrent access to the shared object, LFRC pointer operations that provide CAS semantics may also be provided.

The description that follows focuses on implementations, techniques and methodologies that build upon an illustrative set of pointer operations by which load, store, copy, destroy and CAS operations on pointers are supported. However, the particular set, while generally sufficient to support a wide range of concurrent data structure implementations, is merely illustrative. Based on the description herein, persons of ordinary skill in the art will appreciate implementations of suitable pointer operation sets in which access and manipulation of pointers is performed consistent with the goals described above. For example, some useful additional pointer operations include operations to facilitate passing pointers by value and operations that combine allocation and pointer initialization functions. Suitable pointer operation sets may include versions of other synchronization primitives, such as the load-linked (LL) and store-conditional (SC) synchronization primitives.

We present a methodology for transforming any garbage-collection-dependent concurrent data structure implementation (lock-free or otherwise) that satisfies the two criteria below into an equivalent implementation that does not depend on garbage collection.

1. LFRC Compliance The implementation does not access or manipulate pointers other than through a set of pointer operations that maintain and coordinate updates to reference count states such as described herein. For example, compliance with such a criterion generally precludes the use of pointer arithmetic, unless the implementation thereof enforces the criterion. For example, in some implementations, arithmetic operations on pointers could be overloaded with compliant versions of the arithmetic operations. In an illustrative realization described below, an implementation of a concurrent shared object accesses and manipulates pointers only through a set of functions, procedures or methods that ensure compliance. Although specific sets of pointer operations may vary based on application or exploitation, we illustrate (below) using a set that implements load, store, copy, destroy and CAS operations.
2. Cycle-Free Garbage There are no pointer cycles in garbage. Note that, cycles may exist in the concurrent data structure, but not amongst objects that have been removed from the data structure, and which should be freed.

The transformation preserves lock-freedom. In particular, if the original implementation is lock-free, so too is the garbage-collection-independent algorithm produced by applying our methodology.

LFRC Operations—An Illustrative Set

Subject to the foregoing, an illustrative set of LFRC pointer operations is now described. As stated above, we assume that pointers in a data structure implementation under consideration are accessed only by means of LFRC pointer operations.

1. RCL_Load (A, p)—A is a pointer to shared memory that contains a pointer, and p is a pointer to a local pointer variable. The effect is to load the value from the location pointed to by A into the variable pointed to by p.
2. RCL_Store (A, v)—A is a pointer to shared memory that contains a pointer, and v is a pointer value to be stored in this location.
3. RCL_Copy (p, v)—p is a pointer to a local pointer variable and v is a pointer value to be copied to the variable pointed to by p.
4. RCL_Destroy (v)—v is the value of a local pointer variable that is about to be destroyed.
5. RCL_CAS (A, old, new)—A is a pointer to shared memory that contains a pointer, and old and new are pointer values. The effect is to atomically compare the contents of the location pointed to by A with old and to change these contents to new and return true if the comparison succeeds; if it fails, then the contents of the location pointed to by A are left unchanged, and RCL_CAS returns false.

Illustrative Shared-Memory Multiprocessing Environment and Synchronizations

Figure 2:
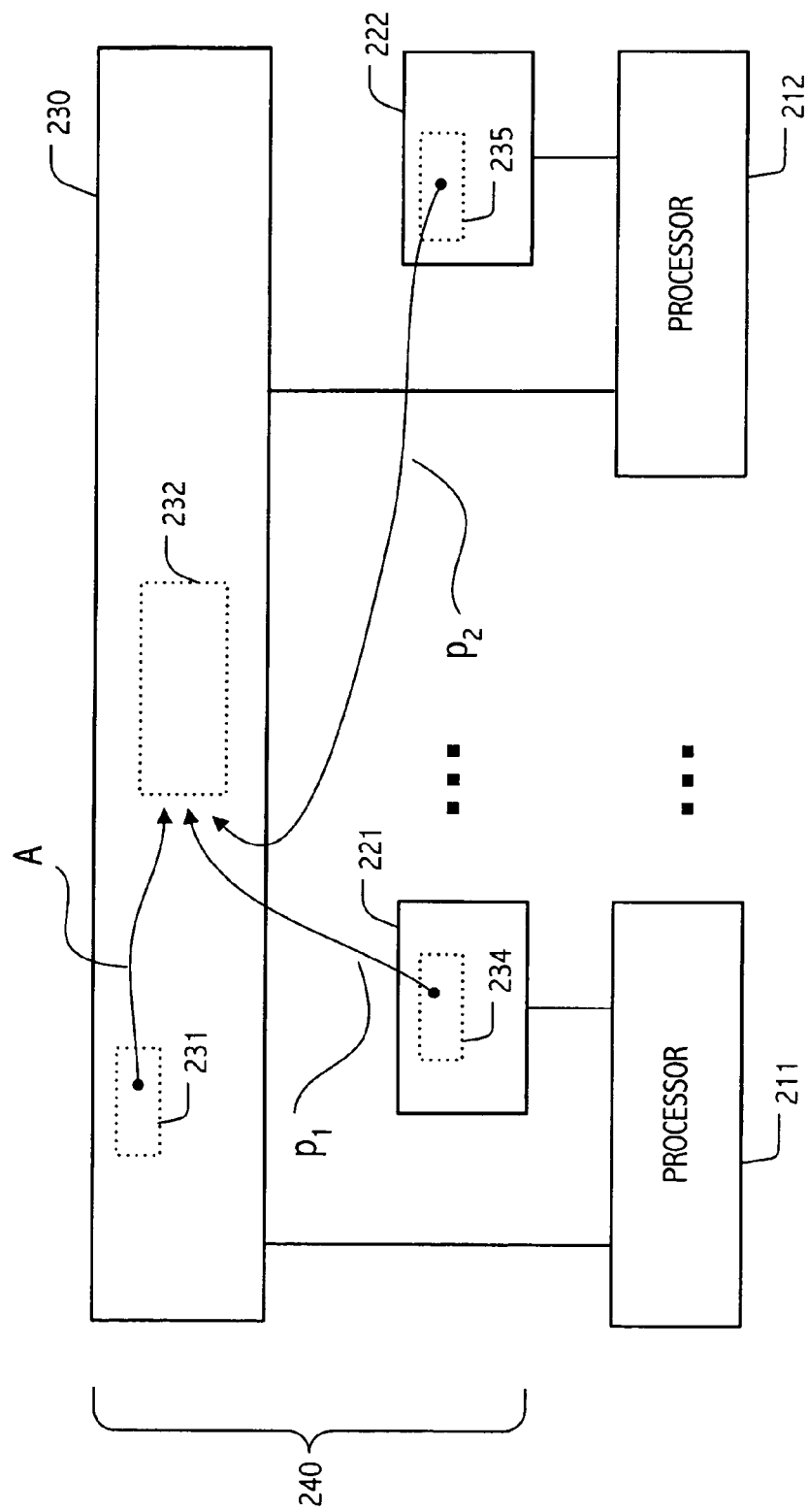
FIG. 2 depicts a shared memory multiprocessor configuration that serves as a useful illustrative environment for describing operation of some shared object implementations in accordance with some embodiments of the present invention.

FIG. 2 depicts a shared memory multiprocessor configuration in which the illustrated set of LFRC pointer operations may be employed. In particular, FIG. 2 depicts a pair of processors 211 and 212 that access storage 240. Storage 240 includes a shared storage portion 230 and local storage portions 221 and 222, respectively accessible by execution threads executing on processors 211 and 212. In general, the multiprocessor configuration is illustrative of a wide variety of physical implementations, including implementations in which the illustrated shared and local storage portions correspond to one or more underlying physical structures (e.g., memory, register or other storage), which may be shared, distributed or partially shared and partially distributed.

Accordingly, the illustration of FIG. 2 is meant to exemplify an architectural view of a multiprocessor configuration from the perspective of execution threads, rather than any particular physical implementation. Indeed, in some realizations, data structures encoded in shared storage portion 230 (or portions thereof) and local storage (e.g., portion 221 and/or 222) may reside in or on the same physical structures. Similarly, shared storage portion 230 need not correspond to a single physical structure. Instead, shared storage portion 230 may correspond to a collection of sub-portions each associated with a processor, wherein the multiprocessor configuration provides communication mechanisms (e.g., message passing facilities, bus protocols, etc.) to architecturally present the collection of sub-portions as shared storage. Furthermore, local storage portions 221 and 222 may correspond to one or more underlying physical structures including addressable memory, register, stack or other storage that are architecturally presented as local to a corresponding processor. Persons of ordinary skill in the art will appreciate a wide variety of suitable physical implementations whereby an architectural abstraction of shared memory is provided. Realizations in accordance with the present invention may employ any such suitable physical implementation.

In view of the foregoing and without limitation on the range of underlying physical implementation of the shared memory abstraction, LFRC pointer operations may be better understood as follows. Shared pointer A is encoded in a shared memory location 231 and references an object 232 in shared memory. One or more pointers such as shared pointer A is (are) employed as operands of the RCL_Load, RCL_Store and RCL_CAS operations described herein. Pointer $p_1$ is encoded in local storage 234 and references an object (e.g., object 232) in shared memory. Pointer $p_2$ is encoded in local storage 235 and also references object 232. In this regard, FIG. 2 illustrates a state, $*p_1 == *A$ && $*p_2 == *A$, consistent with successful completion of load-type operations (e.g., RCL_Load pointer operations) that bring copies of pointer value A into local storage of two threads of a multithreaded computation. The illustrated state is, of course, also consistent with successful completion of other operations including store-type operations (e.g., RCL_Store and RCL_CAS pointer operations).

In the illustration of FIG. 2, a reference count state for object 232 includes at least three references corresponding to pointers A, $p_1$ and $p_2$. Maintaining and coordinating updates to such a reference count state in correspondence with operations on shared storage 232 and local storage 234 and 235 is an important challenge. In the description that follows, we detail a technique whereby contributions to a reference count state are distributed among certain software objects in such a way that maintenance and coordination of updates can be managed using single-target synchronization operations, such as CAS operations, or LL and SC operation pairs.

We describe in detail below implementations based on CAS operations; however, based on that description, persons of ordinary skill in the art will appreciate suitable variations for other synchronization constructs including or LL/SC constructs or emulations. As typically employed, a CAS operation, such as illustrated below, takes the address of a memory location, an expected value, and a new value.

```
bool CAS(a, e, n) {
    atomically {
        if (*a == e) {
            *a = n;
            return true;
        } else
            return false;
    }
}
```

If the location contains the expected value, then the CAS atomically stores the new value into the location and returns true. Otherwise, the contents of the location remain unchanged, and the CAS returns false. We say that the CAS succeeds if it returns true, and that it fails if it returns false.

An alternative synchronization construct involves LL and SC operations used in pairs. An SC operation is matched with the preceding LL operation by the same thread to the same variable; there must be such an LL operation for each SC operation, and no LL operation may match more than one SC operation. LL loads the value of a location, and SC conditionally stores a value to a location, succeeding (returning true) if and only if no other stores to the location have occurred since the matching LL. Note that the LL/SC semantics described above is the ideal semantics. Hardware LL/SC implementations are usually weaker, and in particular, allow SC to fail even in the absence of an intervening store.

Additional LFRC Pointer Operations

In our experience, the operations presented here are sufficient for many concurrent shared object implementations, but can result in somewhat non-transparent code. Accordingly, we have also implemented some extensions that allow more elegant programming and handle issues such as the pointer created by passing a pointer by value transparently. For example, the following variant operations may also be provided, if desired:

1. p=RCL_Load2 (A)—A is a pointer to shared memory that contains a pointer, and p is a local pointer variable, where p is known not to contain a pointer (e.g., it has just been declared) and ordinary reference count state updates for an overwritten pointer may be omitted. The effect is to load the value from the location pointed to by A into p.

2. RCL_StoreAlloc(A, v)—A is a pointer to shared memory that contains a pointer, and v is a pointer value that will not be used (or destroyed) again. Accordingly, there is no need to update a reference count state corresponding to v. This variation is useful when we want to invoke an allocation routine directly as the second parameter, e.g., as RCL_StoreAlloc(&X,allocate_structure( )).

3. RCL_Pass(p)—p is a pointer value to be passed by value and for which a reference count state should be updated. This variation is useful when we want to pass p to a routine, e.g., as Example (, . . . , RCL_Pass (p)).

Based on the description herein, persons of ordinary skill in the art will appreciate variations of the described implementations, which may employ these and other extensions and/or variations on a set of supported pointer operations.

LFRC Methodology

Building on the previously described illustrative set of pointer operations, we describe now steps of a methodology for transforming a GC-dependent implementation into a GC-independent implementation. In general, these steps (with the possible exception of step 4) can be automated using facilities of an object-oriented language such as C++. Based on the description herein, persons of ordinary skill in the art will appreciate a variety of facilities that could be employed. See e.g., Detlefs, *Garbage Collection and Run-Time Typing as a C++ Library*, in Proceedings of the 1992 Usenix C++ Conference, pp. 37-56, 1992 (describing a suitable "smart pointer" technique). Nonetheless, presenting these steps explicitly makes our presentation clearer, and serves as a roadmap for exploitation of our methodology in non-object-oriented languages as well. Accordingly, one suitable transformation is as follows:

1. Add reference count contributions for objects: Associate a pair of reference count contributions with each object used by the implementation. For example, add a status field (including a reference count refCount and an exit count exitcount) to each object type used by the implementation. In exploitations that employ such fields as described more completely below, an object can be freed only when its reference count and its exit count are both zero. Status should be set to $\{1, 0\}$ in a newly-created object. Of course, in an object-oriented language such as C++, initialization may be achieved though object constructors.

2. Add reference count contributions for shared pointers: Associate a reference count contribution with each shared variable that contains a pointer to an object. For example, add a hold count holdCount to each shared reference used by the implementation. Such a hold count tracks private references copied from the shared reference. Upon destruction of given shared pointer, the hold count associated therewith is transferred to the object referenced by the pointer. In exploitations that employ status fields such as described above, hold count can be transferred to the exitCount associated with the object referenced by the to-be-destroyed shared pointer. Hold count should be set to 0 in a newly-created shared pointer.

3. Provide a Destroy_object (v) function: Once an object's status (e.g., <refCount, exitCount>) indicates that no references to the object remain (e.g., a reference count state coded as <0, 1>), it is appropriate to free storage associated with the object. In some realizations, we provide object-type-specific implementations of the Destroy_object ( ) function. We illustrate such a function only because it is the most convenient and language-independent way to iterate over all pointers in an object. However, persons of ordinary skill in the art will appreciate that other implementations (particularly object-oriented implementations) may provide similar facility using language-specific constructs, e.g., an object destructor method.

In any case, an implementation of a destroy_object ( ) function or method provides a mechanism to destroy each shared object identifying pointer encoded in the to-be-destroyed object, triggering atomic decrement of an exit count exitCount associated with each such identified shared object.

After all shared object pointers in the object whose reference count state is <0, 0> have been destroyed, that object can be freed. Some program sequences will trigger a recursive chaining of object destructions. For example, in an illustrative implementation described below, we provide a function (UpdateStatus) that is employed by various lock-free pointer operations of the implementation for the atomic decrement of an exitCount field. The UpdateStatus function, in turn, invokes Destroy_object if <refCount,exitCount> reaches <0, 0>. Destroy_object, in turn, traverses the to-be-destroyed object and employs lock-free pointer operations to destroy certain pointers included therein and to correspondingly update <refCount, exitCount> state using the UpdateStatus function.

4. Ensure no garbage cycles: Ensure that the implementation does not result in referencing cycles in or among garbage objects. This step may be non-trivial or even impossible for some concurrent data structure implementations. If this property cannot be achieved for a particular data structure, then it is not a candidate for applying our methodology. Note that, as illustrated below, the concurrent data structure may include cycles. However, storage no longer reachable should not.

5. Replace pointer operations: Replace each pointer operation with its LFRC pointer operation counterpart. For example, if A0 and A1 are pointers to shared pointer variables, and x, x0, x1, old and new are pointer variables, then replacements may be made as follows:

| Replaced Pointer Operation | LFRC Pointer Operation |
| --- | --- |
| x0 = *A0; | RCL__Load (A0, &x0); |
| *A0 = x0; | RCL__Store (A0, x0); |
| x0 = x1; | RCL__Copy (&x0, x1); |
| CAS (A0, old, new) | RCL__CAS (A0, old, new) |

Note that the table does not contain an entry for replacing an assignment of one shared pointer value to another, for example *A0=*A1. Such assignments are not atomic. Instead, the location pointed to by A1 is read into a register in one instruction, and the contents of the register are stored into the location pointed to by A0 in a separate instruction. This approach should be reflected explicitly in a transformed implementation, e.g., with the following code:

```
{
    ObjectType *x = NULL;
    RCL__Load(A1,&x);
    RCL__Store(A0,x);
    RCL__Destroy(x);
}
``` or its substantial equivalent, whether included directly or using a "wrapper" function.

6. Management of local pointer variables: Finally, whenever a thread loses a pointer (e.g., when a function that has local pointer variables returns, so its local variables go out of scope), it first calls RCL_Destroy ( ) with this pointer. In addition, pointer variables are initialized to NULL before being used with any of the LFRC operations. Thus, pointers in a newly-allocated object should be initialized to NULL before the object is made visible to other threads. It is also important to explicitly remove pointers contained in a statically allocated object before destroying that object.

Implementation of LFRC Pointer Operations

In the description that follows, we describe illustrative implementations of LFRC pointer operations and explain their behavior. For many practical exploitations, the described implementations represent an improvement on techniques described in commonly-owned, co-pending U.S. application Ser. Nos. 09/837,671 and 10/340,150. As a result, use of LFRC pointer operations now detailed may provide significant advantages for some concurrent software and shared-object implementations, computational environments, etc. For some exploitations, the LFRC pointer operations now detailed represent yet another suitable implementation of LFRC pointer operations for possible use in conjunction with the LFRC methodologies described in commonly-owned, co-pending U.S. application Ser. Nos. 09/837, 671 and 10/340,150 as well as herein.

Using the described techniques, we can ensure that there are no memory leaks and that memory is not freed prematurely. The LFRC pointer operations maintain a reference count state for each object, which is represented as a collection of counts some of which are encoded in association with the object itself and some of which are encoded in association with shared pointers that reference the object. Together, the reference count contributions reflect the total number of references to the object. We provide mechanisms for orderly update, transfer and interpretation and eventual consolidation of this distributed representation of reference count. When the reference count state reaches a coding for zero, there are no more pointers to the object and the object can be freed.

Aspects of our techniques will be better understood in the context of certain illustrative data structure implementations and code. Since previously disclosed implementations of lock free reference counting (LFRC) pointer operations have been described using an LFRC moniker or SLFRC (for implementations that employed single-target synchronization), we use a new acronym, RCL (for Reference Counting Light) as a naming convention for structures, operations and functions of another coherent implementation of our LFRC techniques described in greater detail below.

In an illustrative RCL implementation, we envision shared objects and shared pointers each associated with a partial representation of reference count state. For example, a shared object encoding for information of type T, may be represented as an RCL_Obj object that includes storage for a refCount and an exitCount together with storage for T. In such an implementation, a refCount field is used to encode one contribution to reference count state, namely the count of shared references to the shared object (i.e., to the RCL_Obj object or to T itself, depending on the pointer convention employed). In general, type T may be any defined (or definable) type (e.g., a simple int type, a multi-element node of a linked-list, etc.). Thus, the following type definitions provide a useful illustrative context:

```
typedef struct status_s {
    int refCount;
    int exitCount;
} RCL_Status;
typedef struct RCL_Obj_s {
    RCL_Status status;
    T val;
} RCL_Obj;
```

In addition to the refCount field, an exitCount field is used (in the illustrated coding) to facilitate tracking of private references to the shared object, as described more completely below. The illustrated coding of RCL_Status (which includes the refCount and exitCount fields) is atomically updatable using a single-target synchronization (e.g., using a 64-bit CAS operation spanning two 32-bit integer codings of refCount and exitCount fields). While the illustrated RCL_Obj type conveniently encodes RCL_Status in conjunction with storage for information of type T, more generally, an implementation need only associate the atomically-updatable RCL_Status coding with the shared object.

Shared references to the shared object are encoded in a way that associates the shared pointer coding with yet another contribution to reference count state. In an illustrative realization, an integer holdCount is encoded together with a shared pointer to an RCL_Obj shared object as follows:

```
typedef struct RCL_Ref_s {
    RCL_Obj *ref;
    int holdCount;
} RCL_Ref;
```

In this way, a single-target synchronization, e.g., a 64-bit CAS operation, can atomically access both the shared pointer ref and holdcount. As described below, our techniques are not limited to CAS-based implementations, or for that matter to implementations in which a single-target synchronization operates on storage of sufficient width to encode both a shared pointer and a holdcount. Nonetheless, CAS-based access to the particular RCL_Ref coding described above provides a useful illustrative context for our techniques.

Figure 3:
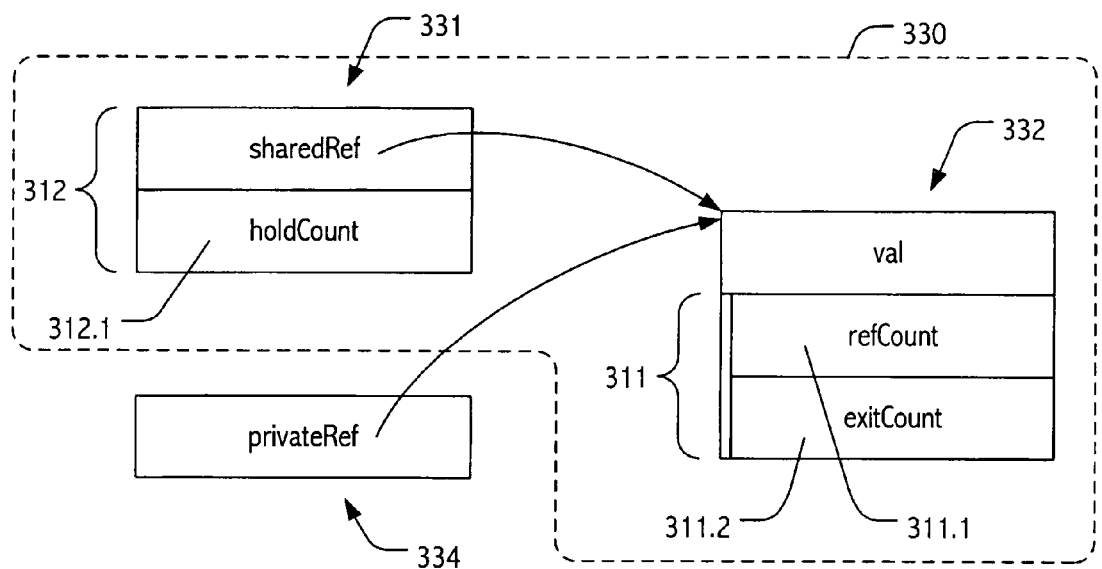
FIG. 3 illustrates organization and functional relationships amongst elements of a reference count encoding in accordance with some embodiments of the present invention. The encoding distributes reference count contributions amongst certain elements of the encoding.

Turning now to FIG. 3, we illustrate a shared object 332 encoded as previously described and instantiated in shared memory 330. Shared object 332 is referenced by a shared pointer 331 encoded as previously described and which is also instantiated in shared memory. In the illustration, a single private (i.e., non-shared) pointer 334 also references shared object 332.

An interesting part of the illustrated approach is that we count only shared references to a shared object such as shared object 332 in its refCount field (311.1) within status field 311, and use a different technique to keep track of private references. The idea is that when a new private reference (e.g., 334) to an object is created by reading from a shared reference (e.g., 331), rather than incrementing the object's reference count field of status field 312, we instead increment the holdCount field of status field 312 (e.g., 312.1) associated with the shared reference from which it is read. This solves the problem explained above, because we no longer need to access shared object 332 to reflect the creation of such private references.

Once a shared pointer to shared object 332, e.g., that stored in a shared reference 331, is destroyed (for example by storing a reference to a different object into that shared variable), the holdCount (e.g., 312.1) associated with the shared reference to shared object 332 is "transferred" to the exitCount (e.g., 311.2) of shared object 332 as part of an atomic update that also decrements the refCount of shared object 332 to reflect the destruction of the shared reference thereto.

Figure 4:
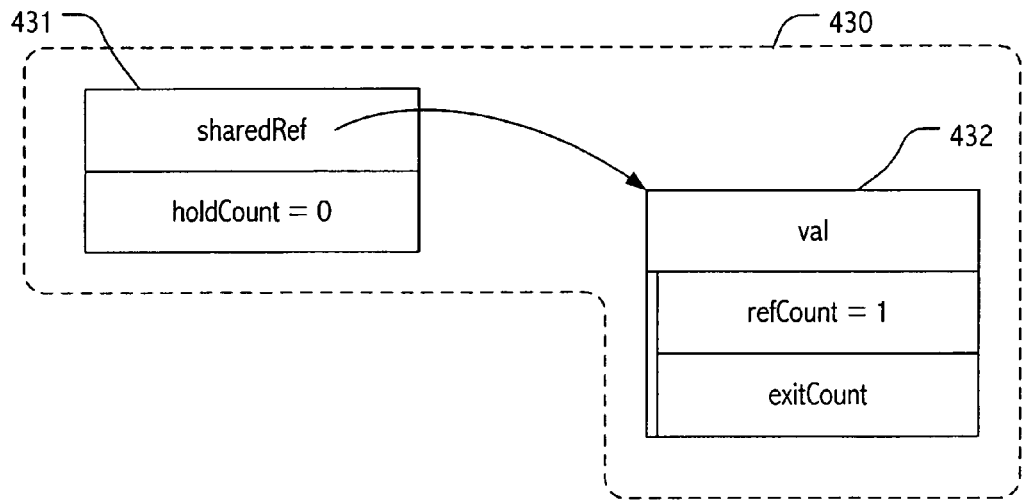
FIGS. 4 and 5 illustrate states of a data structure encoding in accordance with some embodiments of the present invention.

FIGS. 4-9 illustrate as series of reference count states that correspond to operations on shared objects and pointers. In FIG. 4, a shared reference 431, encoded as an RCL_ref, includes a pointer to shared object 432, which is encoded as an RCL_Obj object. Shared reference 431 and shared object 432 reside in shared memory 430. That pointer has not been copied from shared reference 431 to a private variable. Therefore, holdCount is properly zero. The refCount encoding in shared object 432 properly tracks the single shared reference thereto.

Figure 5:
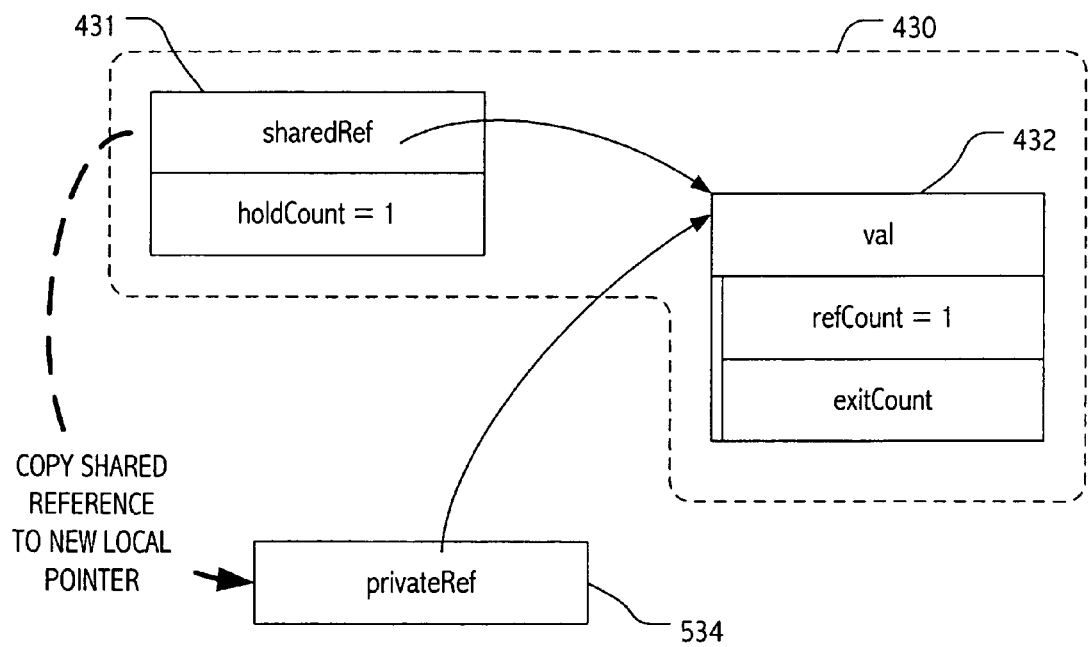

FIG. 5 illustrates results of an LFRC pointer operation that copies the pointer encoded in shared reference 431 to a private variable 534. The pointer coded in private variable 534 now references shared object 432 but that additional reference is tracked, not by shared object 432's refCount, but rather by the holdCount associated with the shared reference 431. Such an update may be performed using an RCL_Load operation as described below.

Figure 6:
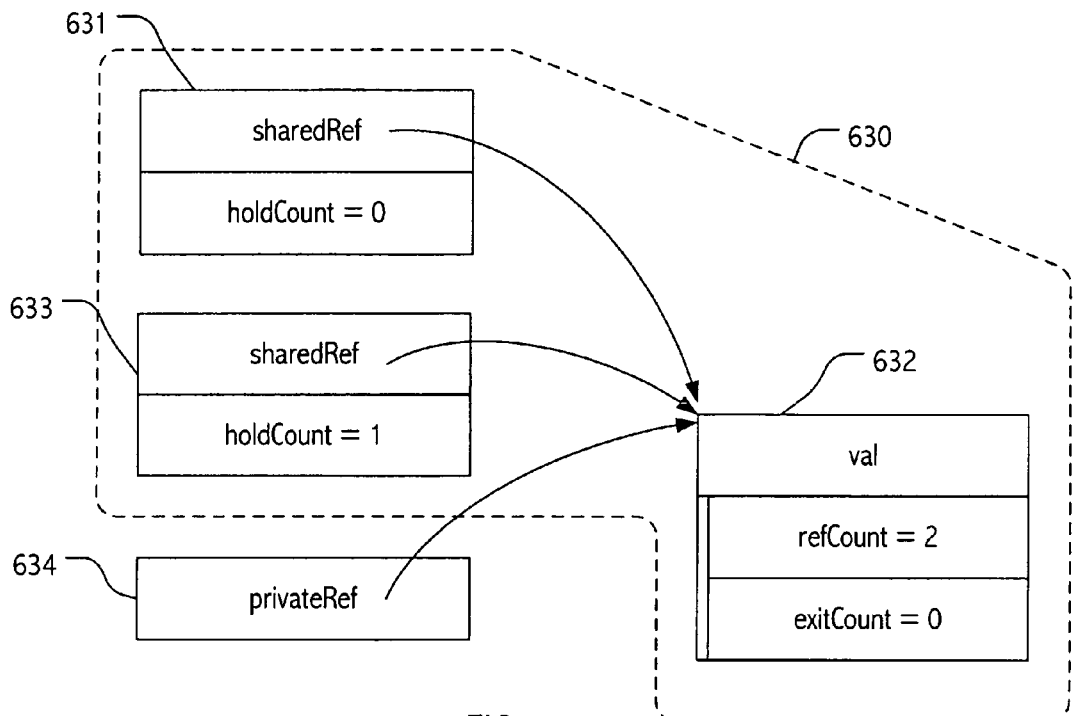
FIGS. 6, 7A, 7B and 7C illustrate states of a data structure encoding in accordance with some embodiments of the present invention.

FIG. 6 depicts an illustrative state in which two shared references 631 and 633 each encode pointers to shared object 632. Shared references 631 and 633 and shared object 632 all reside in shared memory 630. An additional pointer (private reference 634), which has been copied from shared reference 633, resides in private (i.e., non-shared) storage. A refCount (of 2) for shared object 632 indicates that two shared pointers currently reference shared object 632. In addition, a holdCount (of 1) for shared reference 633 indicates that one private reference has been copied from shared reference 633 and is therefore accounted for in a reference count state for shared object 632. In short, the reference count state for shared object 632, which is represented in a distributed form, accounts for all three pointers to shared object 632.

Figure 7A:
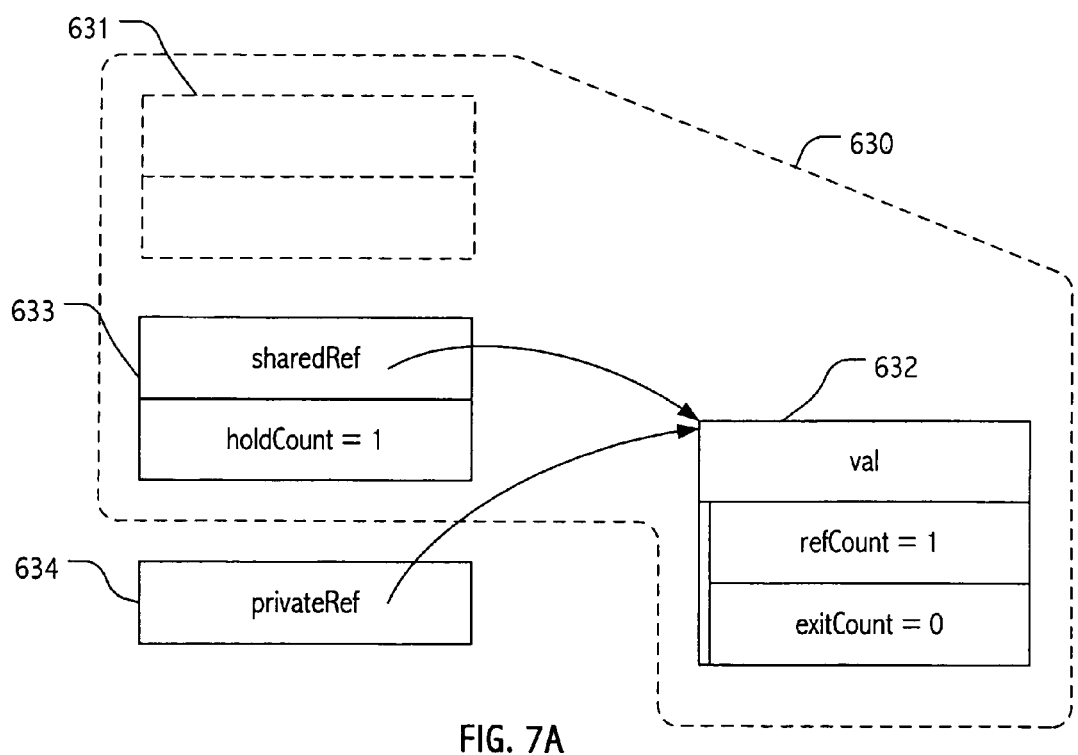
Figure 7B:
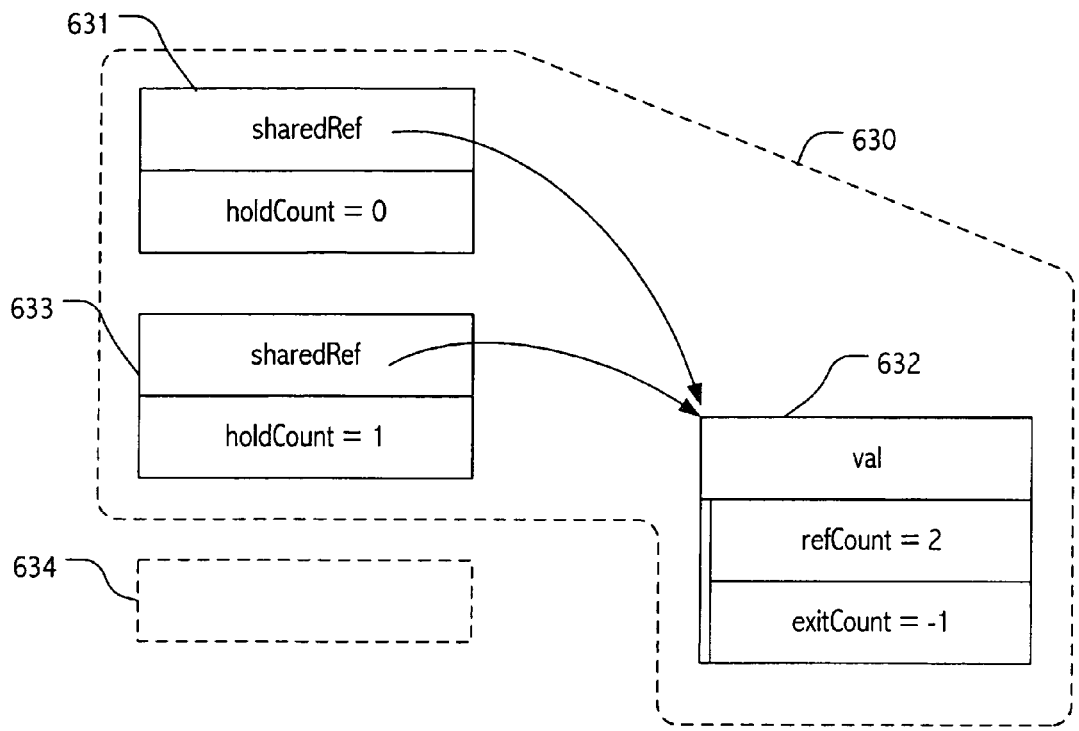
Figure 7C:
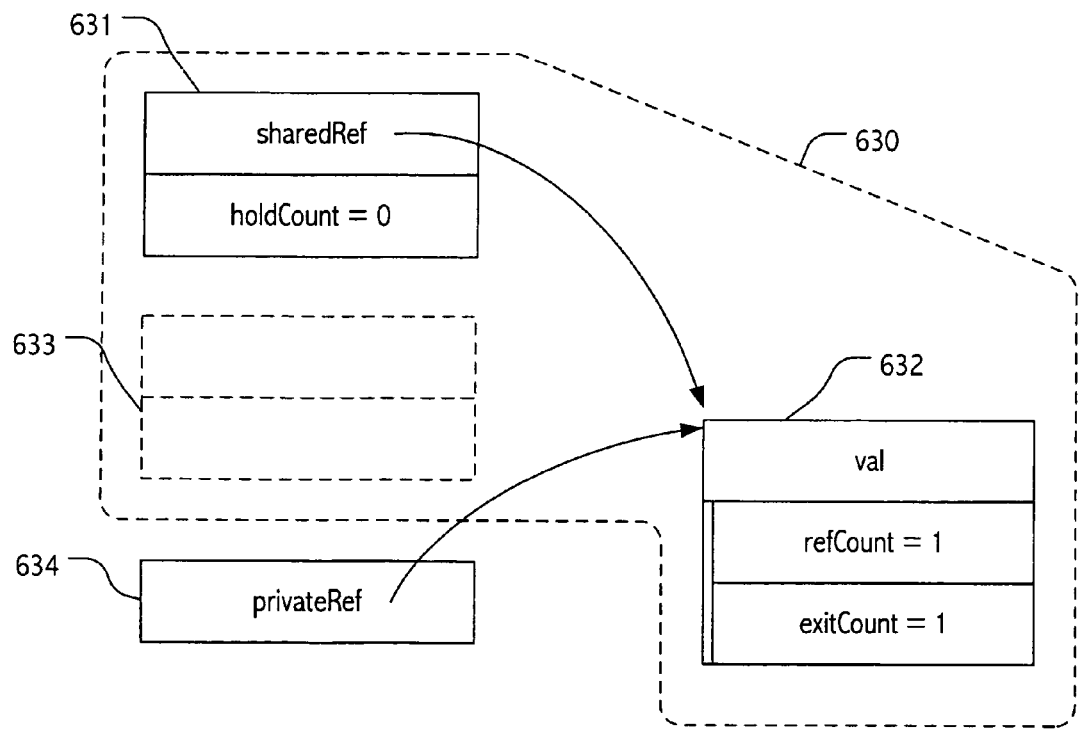

FIGS. 7A, 7B and 7C depict updates to the reference count state illustrated in FIG. 6 for shared object 632. The illustrated updates correspond to respective operations that result in the destruction of shared reference 631 (FIG. 7A), of shared reference 633 (FIG. 7B) or of private reference 634 (FIG. 7C). Turning first to FIG. 7A, we illustrate a reference count state resulting after destruction of shared reference 631 to shared object 632. In general, a shared pointer may be destroyed by being overwritten by another pointer variable or by freeing the storage in which it resides. In either case, destruction of the shared pointer to shared object 632 triggers a reduction in refCount. Since no private copies of shared reference 631 had been made (holdCount=0, see FIG. 6), no change in exitCount is apparent.

Similarly with respect to FIG. 7B, we illustrate a reference count state resulting after destruction of private reference 634 to shared object 632. For clarity, we assume that the reference count state existing just prior to destruction of private reference 634 is consistent with that illustrated in FIG. 6. As before, destruction of a pointer may result from being overwritten by another pointer variable or by freeing the storage in which the pointer resides. In either case, destruction of the private pointer to shared object 632 triggers a reduction in exitCount for shared object 632. In the illustrated case, exitCount=−1. In effect, the reference count state for shared object 632, which is represented in a distributed form, accounts for both of the remaining pointers to shared object 632 (holdCount of shared reference 633 and exitCount of shared object 632 include offsetting components).

Turning to FIG. 7C, we illustrate a reference count state resulting after destruction of shared reference 633 to shared object 632. For clarity, we again assume that the reference count state existing just prior to destruction of shared reference 633 is consistent with that illustrated in FIG. 6. Destruction of the shared pointer to shared object 632 triggers a reduction in refCount and a transfer of the holdCount from shared reference 633. As a result, the reference count state for shared object 632, which is represented in a distributed form, accounts for both of the remaining pointers to shared object 632.

Figure 8:
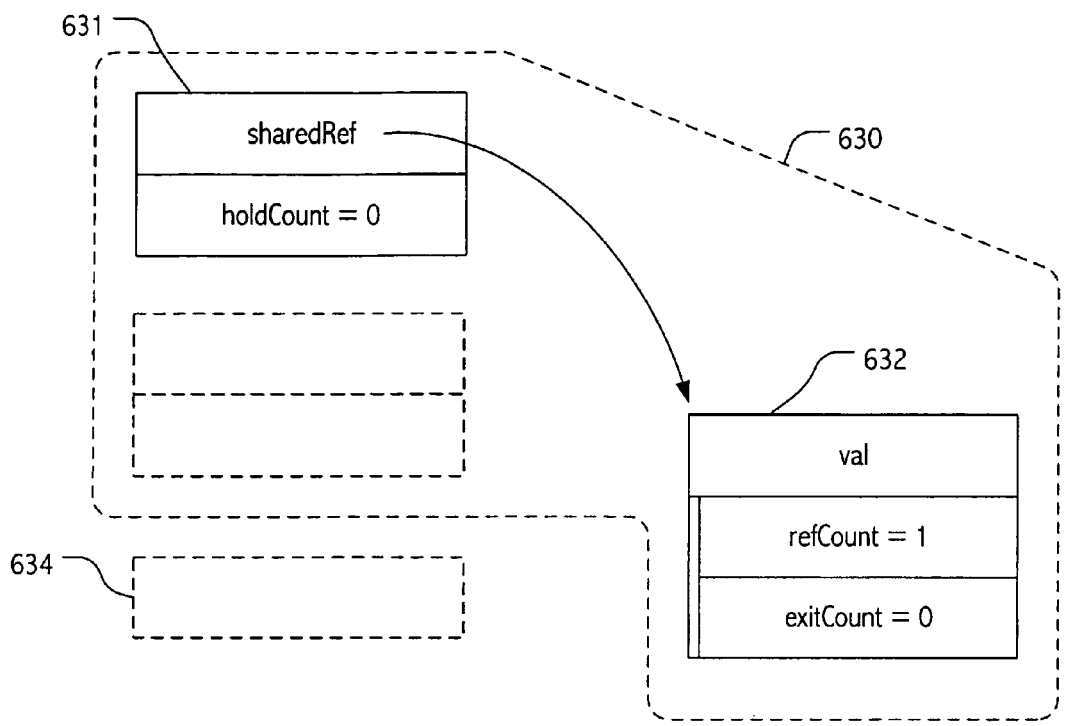
FIGS. 8 and 9 illustrate states of a data structure encoding in accordance with some embodiments of the present invention.
Figure 9:
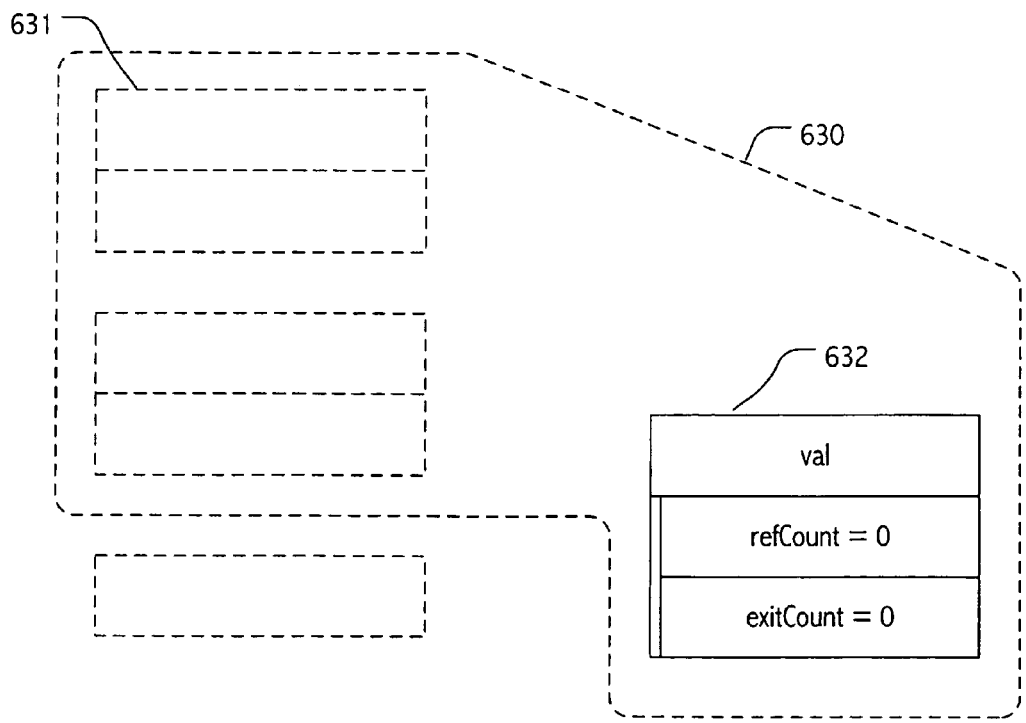

Continuing from the reference count state illustrated in FIG. 7C, we illustrate reference count states along a program trajectory in which remaining references to shared object 632 are destroyed. In FIG. 8, we illustrate a reference count state resulting after destruction of private reference 634. The exit-Count of shared object 632 is decremented and resulting reference count state properly reflects a single remaining reference to shared object 632. Finally in FIG. 9, we illustrate a reference count state resulting after destruction of shared reference 631. The <refCount, exitCount> state for shared object 632, <0, 0> indicates that no references to shared object 632 remain and shared object 632 may be freed.

Illustrative RCL Set of Lock-Free Pointer Operations

We now describe a set of lock-free pointer operations based on our RCL techniques. As a set, these RCL operations are generally interchangeable with the LFRC and SLFRC operation sets previously described, but implement the distributed reference count state techniques described above and advantageously allow for implementations that build upon synchronization mechanisms no stronger than that provided by single-target synchronization operations such as CAS or LL/SC operation pairs. For clarity of description, but without loss of generality, we detail an implementation based on CAS operations. Other implementations will be understood by persons of ordinary skill in the art based on the description herein.

We begin with an implementation of RCL_Load as follows:

```
1   void RCL_Load(RCL_Ref *A, RCL_Obj **dest) {
2       RCL_Ref a;
3       RCL_Obj *olddest = *dest;
4       do {
5           a = *A;
6           if (a.ref == null) {
7               *dest = null;
8               break;
9           }
10      } while(!CAS(A, a, <a.ref, a.holdCount+1>));
11      *dest=a.ref;
12      RCL_Destroy(olddest);
13  }
``` where RCL_Load accepts two parameters, a pointer to a structure A that includes a shared pointer field (ref), and a pointer des t to a local pointer variable of the calling thread. The semantics of the RCL_Load operation is to load the shared pointer value in A.ref into the private variable pointed to by dest. This has the effect of destroying one pointer (the previous value in the location pointed to by dest) and creating another (the new value of *dest). Thus, we may potentially need to update two reference count states.

The RCL_Load operation begins by recording the previous value of the pointer (line 3), so that it can be properly destroyed later. Next, the RCL_Load operation loads a pointer to A and, if the shared pointer field (a.ref) is non-NULL, increments the holdCount field of A to indicate that a private reference copy has been created. We use a CAS operation (at line 10) that covers both the ref and holdCount fields of A to perform the increment. In this way, we ensure that ref has not been updated (e.g., by another thread) and synchronize the increment with any concurrent operation. If the CAS fails, we reload and retry. If the CAS succeeds, we update (line 11) the private variable pointed to by dest and destroy (line 12) the previous value (olddest).

In our implementation, destruction of a pointer to shared object implies proper handling of reference count state for the shared object referenced by olddest. Therefore, unless olddest=null, there is additional work to be done. An illustrative implementation of the RCL_Destroy operation builds upon a more general UpdateStatus function that we employ to atomically update both refCount and exitCount fields of an RCL_Obj structure. For an RCL_Destroy operation, a current refCount remains unchanged and exitCount is decremented.

The RCL_Destroy operation and Updatestatus function will be understood as follows:

```
1   void RCL_Destroy(RCL_Obj *p) {
2       UpdateStatus(p,0,−1);
3   }
4   void UpdateStatus(RCL_Obj *a, int rcDelta, int ecDelta) {
5       Status s, s_new;
6       if (a==null) return;
7       do {
8           s = a->Status;
9           s_new = <s.refCount+rcDelta,s.exitCount+ecDelta>;
10      } while (!CAS(a->Status,s,s_new));
11      if (s_new=<0,0>)
12          Destroy_object(a);
13  }
``` where UpdateStatus employs a CAS operation (at line 10) to synchronize an atomic update of refCount and exitCount fields of the RCL_Obj structure with any concurrent updates. In the particular case of RCL_Destroy operation use of the UpdateStatus function, rcDelta=0 and ecDelta=−1. If the CAS fails, we reload current contents of refCount and exit-Count fields and retry. If the CAS succeeds, we check the status information written by the successful CAS for an indication (<refCount,exitCount>==<0,0>) that no references (other than a) to shared object *a remain. If no such references remain, we free storage identified by a using the Destroy_object function.

```
1   void Destroy_object(RCL_Obj *p) {
2       for each RCL_Ref field f in p do
3           RCL_Store(&p->f,null);
4       free(p);
5   }
```

As described above, we may employ an object-type-specific implementation of the Destroy_object ( ) function or a more general object destructor method in some implementations. In either case, the Destroy_object ( ) function (or similar destructor method) operates to destroy references (e.g., RCL_Ref type shared references) to shared objects, which themselves appear in the shared object (e.g., the RCL_Obj type shared object, p) being destroyed by the Destroy_object ( ) function. To destroy the constituent shared references, we employ an LFRC pointer operation, RCL_Store, to store a null value to each constituent shared reference field and to properly handle reference count state updates for shared objects referenced. Operation of RCL_Store (which in turn employs the UpdateStatus function and may, in turn, trigger additional object destructions) is described in greater detail below. Once constituent shared pointers have been destroyed, shared object p is freed (at line 4).

An RCL_Store operation can be implemented as follows:

```
1   void RCL_Store(RCL_Ref *A, RCL_Obj *v) {
2       RCL_Ref a;
3       if (v!=null)
4           UpdateStatus(v,1,0);
5       while (1) {
6           a = *A;
7           if (CAS(A, a, <v,0>)) {
8               UpdateStatus(a.ref,-1,a.holdCount);
9               return;
10          }
11      }
12  }
``` where the RCL_Store operation accepts two parameters, a pointer to a structure A that includes a shared pointer field (ref), and a pointer value v to be stored in the shared pointer field (ref). Since v is itself a pointer to a shared object, we again have two reference count states with which to be concerned, namely that for the shared object referenced by v and that for the shared object referenced by the about-to-be-overwritten shared reference, A.ref.

If v is non-null, we update (at line 4) the reference count state for the shared object referenced by v using the UpdateStatus function. In particular, we increment refcount for the shared object referenced by v to reflect an additional shared reference that is about to be created. The exitcount for the shared object referenced by v remains unchanged. As before, the UpdateStatus function employs a CAS operation to update <refCount,exitCount> state.

The RCL_Store operation next saves a copy (at line 6), a, of about-to-be-overwritten shared reference A, and attempts to update A (using the CAS at line 7) with a copy of shared pointer value v. Initially, holdCount is zero for new shared reference. If the CAS fails, we reload and retry.

If the CAS succeeds, we update (at line 8) reference count state for the shared object previously identified by A.ref. Consistent with the approach described above, we update the object previously identified by A.ref (i.e., the object now identified by temporary variable a.ref) to decrement its associated refCount and to transfer any holdCount previously associated with A (and still saved as temporary variable a.holdcount). The decrement and transfer is performed atomically using the UpdateStatus function. As before, the UpdateStatus function employs a CAS operation to update <refCount,exitCount> state. Also as before, the update may result in an indication (<refCount,exitCount>==<0,0>) that no references (other than a) remain to the shared object previously identified by A. If no such references remain, we destroy object *a using the Destroy_object function.

Finally, an RCL_CAS operation can be implemented as follows:

```
1   bool RCL_CAS(RCL_Ref *A, RCL_Obj *old, RCL_Obj *new) {
2       RCL_ref a;
3       if (old.ref==new.ref)
4           return (A->ref == old.ref); // Just an optimization
5       UpdateStatus(new,1,0);
6       do {
7           a = *A;
8           if (a.ref != old) {
9               UpdateStatus(new,-1,0);
10              return false;
11          }
12      } while (!CAS(A,a,<new,0>));
13      UpdateStatus(a.ref,-1,a.holdCount);
14  }
``` where the RCL_CAS operation accepts three parameters, corresponding to the CAS parameters described earlier. The illustrated implementation of the RCL_CAS operation is similar to that of the RCL_Store operation in that it updates (at line 5) reference count state for the shared object identified by new before installing a new shared reference (using the CAS at line 12) into the target (shared reference A) of the RCL_CAS operation. As a result, reference count state for the shared object identified by new is artificially high (at least temporarily). However, the RCL_CAS operation differs from the RCL_Store operation in that it does not insist on eventually updating shared reference A. If the old value check at line 8 fails, then RCL_CAS calls UpdateStatus (at line 9) to reverse the previous increment of refCount for the shared object identified by new.

Assuming that the old value check (at line 8) succeeds, we employ a CAS (at line 12) to attempt an update of shared reference A. If the CAS fails, we reload, perform the old value check again, and retry.

If the CAS succeeds, we update reference count state for the shared object previously identified by A.ref. As before, we update the object previously identified by A.ref (i.e., the object now identified by temporary variable a.ref) to decrement its associated refCount and to transfer any holdCount previously associated with A (and still saved as temporary variable a.holdcount). The decrement and transfer is performed atomically using the UpdateStatus function at line 13. As before, the UpdateStatus function itself employs a CAS operation to update <refCount,exitCount> state. Also as before, the update may result in an indication (<refCount,exitCount>==<0,0>) that no references (other than a) remain to the shared object previously identified by A. If no such references remain, we destroy object *a using the Destroy_object function.

While the above-described RCL_Load, RCL_Store and RCL_CAS operations (together with UpdateStatus and Destroy_object functionality) are sufficient for the implementation (or transformation) of typical concurrent shared objects, other implementations and other concurrent shared objects may employ alternative or additional LFRC pointer operations. For example, in some implementations, an RCL_Copy operation may be useful. One implementation is as follows:

```
1   void RCL_Copy(RCL_Obj **v, RCL_Obj *w) {
2       RCL_Obj *old = *v;
3       UpdateStatus(w,0,1);
4       *v = w;
5       RCL_Destroy(old);
6   }
``` where the RCL_Copy operation accepts two parameters, a pointer v to a private pointer variable that references a shared object, and a value w of a private pointer variable that references a shared object. The semantics of this operation is to assign the value w to the variable pointed to by v. This will create a new private pointer to the shared object referenced by w (if w is not NULL), so RCL_Copy updates (at line 3) the reference count of that shared object using the UpdateStatus function. RCL_Copy then assigns the value w to the pointer variable pointed to by v. Finally, since the RCL_Copy operation also destroys a pointer, namely the previous contents of *v, it calls RCL_Destroy (line 5) to free storage associated with the temporary variable old and trigger an appropriate reference count state update for the shared object previously referenced by *v.

Some implementations or transformations may exploit other LFRC pointer operations such as the previously described RCL_Pass operation, which may be implemented as follows:

```
1   RCL_Obj * RCL_Pass(RCL_Obj *v) {
2       UpdateStatus(v,0,1);
3       return v;
4   }
``` where the RCL_Pass function may be employed to facilitate passing a pointer by value while appropriately maintaining a corresponding reference count. These and other variations on the illustrated set of LFRC pointer operations will be appreciated by persons of ordinary skill in the art based on the description herein.

The described embodiments may be provided as a computer program product, or software, possibly encoded in a machine-readable medium as instructions used to program a computer system (or other electronic devices) to perform a process. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other types of medium suitable for storing electronic instructions.

Alternative Synchronization Support

While have illustrated in detail certain implementations of our techniques for architectures that support single-target CAS operations that are sufficient to span (on the one hand) a pointer coding and an integer coding of sufficient width to avoid saturation with holdCount values possible in any practical exploitation and, which are sufficient to span (on the other hand) a pair of integer codings of sufficient width to avoid saturation with refCount and exitCount values possible in any practical exploitation. For example, a typical 64-bit CAS (which is supported on many modern processors, including those based on the SPARC™ architecture) is generally sufficient to span relevant combinations of 32-bit pointers and realistic integer values of holdCount, ref Count and exitCount. Nonetheless, other synchronizations (including CAS or CAS-type operations of differing width, LL/SC operation pairs, etc.) are also possible. Persons of ordinary skill in the art will appreciate the appropriate modifications based on the basic CAS-based implementation(s) described.

SPARC architecture based processors are available from Sun Microsystems, Inc, Palo Alto, Calif. SPARC trademarks are used under license and are trademarks or registered trademarks of SPARC International, Inc. in the United States and other countries. Products bearing SPARC trademarks are based upon an architecture developed by Sun Microsystems.

While most modern architectures support CAS or LL/SC synchronization with targets of sufficient width to span both an architectural width pointer and an integer, the present techniques are not necessarily limited to such architectures. Indeed, it is straightforward to apply the techniques of commonly-owned U.S. patent application Ser. No. 11/026,849, entitled "PRACTICAL IMPLEMENTATION OF ARBITRARY-SIZED LL/SC VARIABLES," and naming Moir, Doherty, Luchangco and Herlihy as inventors, to provide suitable synchronization support even in architectures for which architectural primitives are of insufficient width to directly span the described RCL_Ref or RCL_Status structures. U.S. patent application Ser. No. 11/026,849 is incorporated by reference herein.

As described in the incorporated reference, load-linked, store-conditional (LL/SC) synchronization may be emulated using techniques that employ only pointer-sized single-target synchronization operations to coordinate access to pointer-referenced LL/SC variables. In one such exploitation, LL/SC variables are defined to correspond to the RCL_Ref and RCL_Status structures described above, thereby obviating the need to directly span such structures with a single-target synchronization. In this way, the present lock-free reference counting techniques may be exploited even in architectures in which an available (or desirable) synchronization primitive merely spans an architectural-width pointer. Using the techniques detailed in U.S. patent application Ser. No. 11/026, 849, an LL/SC variable may be defined that encompasses the fill-width of the described RCL_Ref or RCL_Status structures or similar structures.

Other Embodiments

While the invention(s) is(are) described with reference to various implementations and exploitations, it will be understood that these embodiments are illustrative and that the scope of the invention(s) is not limited to them. Terms such as always, never, all, none, etc. are used herein to describe sets of consistent states presented by a given computational system, particularly in the context of correctness proofs. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed. Operations that "coincide" typically need not occur simultaneously, but rather through a sequence of operations that may appear to be atomic.

Many variations, modifications, additions, and improvements are possible. For example, while application to particular concurrent shared objects and particular implementations thereof have been described in detail herein, applications to other shared objects and other implementations will also be appreciated by persons of ordinary skill in the art. For example, while techniques and mechanisms have been described using CAS operations as an exemplary single-target synchronization, persons of ordinary skill in the art will recognize that it is straightforward to modify such implementations for use in architectures that support LL/SC rather than (or in addition to) CAS. Similarly, though natural (positive-sense) integer codings have been used for components of a distributed reference count state, any of a variety of other codings may be employed. In general, uses of incrementation and decrementation may be uniformly transposed in alternative implementations, if desired.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method, comprising:
   using a computer to perform transforming program instructions executable to implement a concurrent shared data structure from instructions that implement a concurrent data structure that relies on the existence of a garbage collection facility to manage storage reclamation to instructions that implement a concurrent data structure that does not rely on the existence of a garbage collection facility to manage storage reclamation;
   wherein said transforming comprises:
      providing program instructions executable to associate a reference count with each instance of the concurrent shared data structure;
      modifying the program instructions executable to implement the concurrent shared data structure such that they ensure cycle-free garbage;
      replacing program instructions executable to implement pointer accesses in the program instructions executable to implement the concurrent shared data structure with corresponding program instructions executable to implement counterpart pointer operations that are lock-free and that maintain the reference count associated with each instance of the concurrent shared data structure, wherein said replacing comprises replacing program instructions executable to implement an access that assigns a pointer value to a pointer variable with program instructions executable to implement one or more lock-free, reference-count-maintaining load, store, or copy operations; and
      providing program instructions executable to explicitly manage one or more local pointer variables using a destroy operation that is lock-free, that maintains a respective reference count contribution associated with local pointer variables on which it operates, and that is configured to implement: freeing storage associated with local pointer variables on which it operates in response to determining that a corresponding reference count contribution indicates zero, and otherwise decrementing the corresponding reference count contribution.

2. The method of claim 1, wherein the counterpart pointer operations employ dual-target compare-and-swap type synchronizations.

3. The method of claim 1, wherein the counterpart pointer operations employ only single-target synchronizations.

4. The method of claim 3, wherein the single-target synchronizations comprise one or more of compare-and-swap (CAS) synchronizations and load-linked, store-conditional (LL/SC) synchronizations.

5. The method of claim 1, wherein the reference count associated with each shared object instance comprises at least two separately encoded reference count values that contribute to the reference count and that collectively indicate a number of references to the shared object instance.

6. The method of claim 5, wherein a first of the at least two reference count values indicates a number of shared references to the shared object instance and a second of the at least two reference count values indicates a number of private references to the shared object instance.

7. The method of claim 6 further comprising associating a private reference count value with each shared reference to the shared object instance, wherein a private reference count value associated with a shared reference indicates a number of private references copied from the shared reference.

8. The method of claim 7, wherein the destroy operation is further configured to transfer the private reference count value of a shared reference to the second reference count value of the corresponding shared object instance incident with destruction of the shared reference.

9. The method of claim 1, wherein said replacing program instructions executable to implement an access that assigns a pointer value to a pointer variable includes:
   replacing the program instructions executable to implement the access with the program instructions executable to implement the lock-free, reference-count-maintaining load operation when the pointer value is a shared pointer value and the pointer variable is a local pointer variable;
   replacing the program instructions executable to implement the access with the program instructions executable to implement the lock-free, reference-count-maintaining load operation when the pointer value is a local pointer value and the pointer variable is a shared pointer variable; or
   replacing the program instructions executable to implement the access with the program instructions executable to implement the lock-free, reference-count-maintaining load operation when the pointer value is a local pointer value and the pointer variable is a local pointer variable.

10. The method of claim 1, wherein said replacing program instructions executable to implement pointer an access that assigns a pointer value to a pointer variable includes:
   when the pointer value is a shared pointer value and the pointer variable is a shared pointer variable, replacing the program instructions executable to implement the access with:
      program instructions executable to implement the lock-free, reference-count-maintaining load operation to a local temporary variable;

program instructions executable to implement the lock-free, reference-count-maintaining store operation from the local temporary variable; and program instructions executable to implement a lock-free, reference-count-maintaining destroy operation that is configured to implement freeing storage associated with the local temporary variable in response to determining that a corresponding reference count has reached zero.

11. The method of claim 1, wherein the counterpart pointer operations include object type specific instances thereof.

12. The method of claim 1, wherein the counterpart pointer operations are generic to plural object types.

13. The method of claim 1, wherein the destroy operation is recursive.

14. The method of claim 1, further comprising:
using the computer to perform generating a computer program product storing a computer readable encoding comprising the transformed program instructions executable to implement the concurrent shared data structure, wherein the computer readable encoding is instantiable in dynamically-allocated shared storage, the computer readable encoding further comprising functional sequences that facilitate access to the concurrent shared data structure and that include the counterpart pointer operations.

15. A non-transitory machine-readable storage media encoding a computer program product, the computer program product comprising:
a first sequence of instructions computer-executable to associate a reference count with each instance of a shared object in code computer-executable to implement the shared object;
a second sequence of instructions computer-executable to provide a destroy object function for the code that is lock-free, that maintains a respective reference count associated with shared objects on which it operates, and that is configured to implement: freeing storage associated with an instance of a shared object in response to determining that a reference count associated therewith indicates that the shared object instance is no longer referenced and computer-executable to otherwise decrement the associated reference count; and
a third sequence of instructions computer-executable to replace pointer operations in the code with corresponding counterpart pointer operations that are lock-free and that maintain the reference count associated with each instance of the concurrent shared data structure, wherein to replace pointer operations in the code, the third sequence of instructions is computer-executable to replace a pointer operation that assigns a pointer value to a pointer variable with one or more lock-free, reference-count-maintaining load, store, or copy operations.

16. The computer program product of claim 15, wherein the counterpart pointer operations employ a dual-target compare-and-swap type synchronization to maintain the reference count associated with each instance of the concurrent shared data structure.

17. The computer program product of claim 15, wherein the counterpart pointer operations employ single-target synchronizations to maintain the reference count associated with each instance of the concurrent shared data structure, wherein the single-target synchronizations include one or more of single-target compare-and-swap operations and load-linked, store-conditional operation pairs.

18. The computer program product of claim 15,
wherein the reference count associated with each instance of the concurrent shared data structure comprises at least two separately encoded reference count values that contribute to the reference count and that collectively indicate a number of references to the shared object instance,
wherein a first of the at least two reference count values indicates a count of shared references to a corresponding instance of a shared object,
wherein a second of the at least two reference count values indicates a count of private references to the corresponding instance of the shared object.

19. The computer program product of claim 18 further comprising a fourth sequence of instructions computer-executable to associate a private reference count with each shared reference to an instance of a shared object in the code.

20. The computer program product of claim 15, wherein to replace pointer operations in the code, the third sequence of instructions is computer-executable to implement one or more of:
replacing the pointer operation that assigns the pointer value to a the pointer variable with a lock-free, reference-count-maintaining load operation when the pointer value is a shared pointer value and the pointer variable is a local pointer variable;
replacing the pointer operation that assigns the value to a the pointer variable with a lock-free, reference-count-maintaining load operation when the pointer value is a local pointer value and the pointer variable is a shared pointer variable; or
replacing the pointer operation that assigns the pointer value to a the pointer variable with a lock-free, reference-count-maintaining load operation when the pointer value is a local pointer value and the pointer variable is a local pointer variable.

21. The computer program product of claim 15,
wherein the first sequence of instructions are further computer-executable to associate a second reference count with each shared object instance,
wherein the computer program product comprises program instructions computer-executable to implement updating the reference count associated with each shared object instance is in response to the destruction and creation of shared references to the shared object instance,
wherein the computer program product comprises program instructions computer-executable to implement updating the second reference count associated with each shared object instance is in response to the destruction and creation of private copies of the respective shared references.

22. The computer program product of claim 15, wherein the second sequence of instructions is further computer-executable to call itself recursively in response to determining that a reference count associated with a shared object indicates no references to the shared object.

23. An apparatus, comprising:
means for storing electronic instructions representing executable code and data; and
means for transforming code executable to implement a shared data object from code executable to implement a shared data object that relies on the existence of a garbage-collection facility to manage storage reclamation to code executable to implement a shared data object that does not rely on the existence of a garbage collection facility to manage storage reclamation, wherein the means for transforming comprises means for replacing pointer operations in the code with corresponding counterpart pointer operations that are lock-free, wherein to replace pointer operations in the code, the means for transforming code replaces a pointer operation that assigns a pointer value to a pointer variable with one or more lock-free load, store, or copy operations.

24. The apparatus of claim 23, wherein the counterpart pointer operations maintain a corresponding reference count.

25. The apparatus of claim 23, wherein the means for transforming comprises means for associating a reference count field with each instance of the shared data object in the code.

26. The apparatus of claim 23, wherein the means for transforming comprises means for associating a plurality of reference count values with each instance of the shared data object, wherein the plurality of reference count values for a shared data object instance collectively indicate a count of references to the shared data object instance.

27. The apparatus of claim 26, wherein the plurality of reference count values for a shared data object instance comprise:
   a first reference count value that indicates a count of shared references to the shared data object instance; and
   a second reference count value that indicates a count of private references to the shared data object instance.

28. The apparatus of claim 23, wherein the means for transforming further comprises means for providing a destroy object function that frees a shared object instance in response to determining that a reference count value associated with the shared object instance indicates no references to the shared object and that otherwise decrements the reference count value.

* * * * *